(12) United States Patent
Shakkari et al.

(10) Patent No.: US 12,307,799 B1
(45) Date of Patent: May 20, 2025

(54) DOCUMENT INGESTION PIPELINE

(71) Applicant: AstrumU, Inc., Bellevue, WA (US)

(72) Inventors: Kaushik Shakkari, Redmond, WA (US); Jing Chen, Kirkland, WA (US)

(73) Assignee: AstrumU, Inc., Bellevue, WA (US)

( * ) Notice: Subject to any disclaimer, the term of this patent is extended or adjusted under 35 U.S.C. 154(b) by 0 days.

(21) Appl. No.: 18/893,348

(22) Filed: Sep. 23, 2024

(51) Int. Cl.
| | |
|---|---|
| *G06V 30/414* | (2022.01) |
| *G06F 16/901* | (2019.01) |
| *G06F 16/9038* | (2019.01) |
| *G06F 16/906* | (2019.01) |
| *G06F 16/93* | (2019.01) |
| *G06V 30/19* | (2022.01) |
| *G06V 30/413* | (2022.01) |

(52) U.S. Cl.
CPC ........ *G06V 30/414* (2022.01); *G06F 16/9024* (2019.01); *G06F 16/9038* (2019.01); *G06F 16/906* (2019.01); *G06F 16/93* (2019.01); *G06V 30/19173* (2022.01); *G06V 30/413* (2022.01)

(58) Field of Classification Search
CPC .... G06F 16/93; G06F 16/906; G06F 16/9024; G06F 16/9038; G06V 30/413; G06V 30/414; G06V 30/1973
See application file for complete search history.

(56) References Cited

U.S. PATENT DOCUMENTS

| | | | |
|---|---|---|---|
| 6,067,535 A | 5/2000 | Hobson et al. | |
| 6,199,062 B1 | 3/2001 | Byrne et al. | |
| 6,606,480 B1 | 8/2003 | L allier et al. | |
| 8,090,725 B1 | 1/2012 | Cranfill | |
| 8,103,679 B1 | 1/2012 | Cranfill et al. | |
| 8,375,026 B1 | 2/2013 | Elliott et al. | |
| 8,688,694 B2 | 4/2014 | Dexter | |
| | (Continued) | | |

FOREIGN PATENT DOCUMENTS

| | | |
|---|---|---|
| KR | 10-2020-0140246 | 12/2020 |
| WO | 03/054727 A1 | 7/2003 |
| WO | 2020/003325 A1 | 1/2020 |

OTHER PUBLICATIONS

Office Communication for U.S. Appl. No. 17/888,920 mailed Nov. 16, 2022, 22 Pages.

(Continued)

*Primary Examiner* — Daniel G Mariam
(74) *Attorney, Agent, or Firm* — John W. Branch; Branch Partners PLLC

(57) ABSTRACT

Embodiments manage data for document ingestion pipelines. Terms in a document may be determined based on a term location within the document. A layout graph that includes term nodes may be generated based on the terms such that each of the terms corresponds to a different term node. Relationships between the term nodes may be determined based on a traversal of the layout graph such that the layout graph may be partitioned into content shapes based on a strength of the relationships. The content shapes may be classified to reduce computational resources for extracting information from the document based on types associated with each content shape such that the types may be associated with extraction models that each support a plurality of different document formats. Extraction models may be employed to extract information from the classified content shapes.

24 Claims, 19 Drawing Sheets

(56) References Cited

U.S. PATENT DOCUMENTS

| | | |
|---|---|---|
| 8,943,062 B2 | 1/2015 | Baumgartner et al. |
| 9,529,863 B1 | 12/2016 | Gindin et al. |
| 9,535,963 B1 | 1/2017 | Shankar et al. |
| 9,849,388 B2 | 12/2017 | Cohen et al. |
| 10,230,701 B2 | 3/2019 | Ullrich et al. |
| 10,610,792 B2 | 4/2020 | Adekunle et al. |
| 10,789,755 B2 | 9/2020 | Amer et al. |
| 11,074,476 B2 | 7/2021 | Wray et al. |
| 11,074,509 B1 | 7/2021 | Wray et al. |
| 11,151,673 B1 | 10/2021 | Wray et al. |
| 11,227,240 B2 | 1/2022 | Cohen et al. |
| 11,250,721 B2 | 2/2022 | Angel et al. |
| 11,354,485 B1 * | 6/2022 | O'Gorman ............ G06F 40/103 |
| 11,423,424 B2 * | 8/2022 | Gustafson ............. G06N 5/022 |
| 11,429,893 B1 | 8/2022 | Tong |
| 11,494,863 B2 | 11/2022 | Wray et al. |
| 11,551,681 B1 | 1/2023 | Pandey et al. |
| 11,580,323 B2 | 2/2023 | Wray et al. |
| 11,587,190 B1 | 2/2023 | Frischmann |
| 11,783,605 B1 * | 10/2023 | Sekhar .................. G06V 10/82 |
| 11,847,172 B2 | 12/2023 | Pedersen et al. |
| 11,854,535 B1 | 12/2023 | Zhang et al. |
| 11,861,321 B1 | 1/2024 | O'Kelly et al. |
| 11,922,332 B2 | 3/2024 | Wray et al. |
| 11,928,607 B2 | 3/2024 | Wray et al. |
| 12,045,270 B2 * | 7/2024 | Ferreira Lima ......... G06N 5/02 |
| 12,099,975 B1 | 9/2024 | Cai et al. |
| 2002/0055870 A1 | 5/2002 | Thomas |
| 2002/0059228 A1 | 5/2002 | Mccall et al. |
| 2004/0236598 A1 | 11/2004 | Thomsen |
| 2005/0080656 A1 | 4/2005 | Crow et al. |
| 2005/0239032 A1 | 10/2005 | Hartenberger |
| 2006/0229896 A1 | 10/2006 | Rosen et al. |
| 2006/0265436 A1 | 11/2006 | Edmond et al. |
| 2006/0271421 A1 | 11/2006 | Steneker et al. |
| 2007/0082324 A1 | 4/2007 | Johnson et al. |
| 2007/0106811 A1 | 5/2007 | Ryman |
| 2008/0155588 A1 | 6/2008 | Roberts et al. |
| 2008/0254423 A1 | 10/2008 | Cohen |
| 2009/0157619 A1 | 6/2009 | Oates et al. |
| 2010/0057659 A1 | 3/2010 | Phelon et al. |
| 2010/0125475 A1 | 5/2010 | Twyman |
| 2010/0145729 A1 | 6/2010 | Katz |
| 2011/0177483 A1 | 7/2011 | Needham et al. |
| 2011/0238591 A1 | 9/2011 | Kerr et al. |
| 2012/0022906 A1 | 1/2012 | Snyder et al. |
| 2012/0196261 A1 | 8/2012 | Kim et al. |
| 2012/0208166 A1 | 8/2012 | Ernst et al. |
| 2013/0204675 A1 | 8/2013 | Dobell |
| 2013/0275446 A1 | 10/2013 | Jain et al. |
| 2013/0281798 A1 | 10/2013 | Rau et al. |
| 2013/0291098 A1 | 10/2013 | Chung et al. |
| 2013/0317377 A1 | 11/2013 | Gupta et al. |
| 2014/0025427 A1 | 1/2014 | Bastian et al. |
| 2014/0089219 A1 | 3/2014 | Mathews |
| 2014/0172732 A1 | 6/2014 | Baladi |
| 2014/0272889 A1 | 9/2014 | Kulkarni et al. |
| 2014/0279632 A1 | 9/2014 | Andersen et al. |
| 2015/0088793 A1 | 3/2015 | Burgess et al. |
| 2015/0127565 A1 | 5/2015 | Chevalier et al. |
| 2015/0140526 A1 | 5/2015 | Marino et al. |
| 2015/0242979 A1 | 8/2015 | Abts |
| 2015/0302359 A1 | 10/2015 | Krishnamoorthy et al. |
| 2015/0310393 A1 | 10/2015 | Bhaskaran et al. |
| 2015/0317754 A1 | 11/2015 | Goel et al. |
| 2015/0347917 A1 | 12/2015 | Hua et al. |
| 2015/0379429 A1 | 12/2015 | Lee et al. |
| 2015/0379454 A1 | 12/2015 | Polli et al. |
| 2016/0217701 A1 | 7/2016 | Brown et al. |
| 2016/0293036 A1 | 10/2016 | Niemi et al. |
| 2016/0352760 A1 | 12/2016 | Mrkos et al. |
| 2016/0379170 A1 | 12/2016 | Pande |
| 2017/0024701 A1 | 1/2017 | Tang et al. |
| 2017/0061817 A1 | 3/2017 | Mettler May |
| 2017/0076244 A1 | 3/2017 | Bastide et al. |
| 2017/0109448 A1 | 4/2017 | Adamy et al. |
| 2017/0213179 A1 | 7/2017 | Schissel et al. |
| 2017/0213190 A1 | 7/2017 | Hazan |
| 2017/0243163 A1 | 8/2017 | Vootkur |
| 2017/0270487 A1 | 9/2017 | Rennison et al. |
| 2017/0293841 A1 | 10/2017 | Mcallister et al. |
| 2017/0323211 A1 | 11/2017 | Bencke et al. |
| 2017/0323233 A1 | 11/2017 | Bencke et al. |
| 2018/0039946 A1 | 2/2018 | Bolte et al. |
| 2018/0046623 A1 | 2/2018 | Faith et al. |
| 2018/0144253 A1 | 5/2018 | Merhav et al. |
| 2018/0157995 A1 | 6/2018 | O'malley |
| 2018/0225593 A1 | 8/2018 | Cozine et al. |
| 2018/0247549 A1 | 8/2018 | Martin et al. |
| 2018/0253655 A1 | 9/2018 | Wang et al. |
| 2018/0293327 A1 | 10/2018 | Miller et al. |
| 2018/0300755 A1 | 10/2018 | Rohilla et al. |
| 2018/0357608 A1 | 12/2018 | Agrawal et al. |
| 2019/0009133 A1 | 1/2019 | Mettler May |
| 2019/0102700 A1 | 4/2019 | Babu et al. |
| 2019/0108217 A1 | 4/2019 | Chen |
| 2019/0122161 A1 | 4/2019 | Cicio, Jr. |
| 2019/0151758 A1 | 5/2019 | Anglin et al. |
| 2019/0180098 A1 | 6/2019 | Carpenter et al. |
| 2019/0220547 A1 | 7/2019 | Chen et al. |
| 2019/0251477 A1 | 8/2019 | Crosta et al. |
| 2019/0279159 A1 | 9/2019 | Cleaver et al. |
| 2019/0378050 A1 | 12/2019 | Edkin et al. |
| 2020/0051460 A1 | 2/2020 | Bedor et al. |
| 2020/0125928 A1 | 4/2020 | Doyle |
| 2020/0211041 A1 | 7/2020 | Raudies et al. |
| 2020/0302296 A1 | 9/2020 | Miller |
| 2020/0320371 A1 | 10/2020 | Baker |
| 2020/0394592 A1 | 12/2020 | Shi et al. |
| 2021/0158074 A1 | 5/2021 | Wray et al. |
| 2021/0256310 A1 | 8/2021 | Roberts et al. |
| 2021/0256644 A1 | 8/2021 | Cahalane et al. |
| 2021/0279668 A1 | 9/2021 | Mikhajlov |
| 2021/0334921 A1 | 10/2021 | Austin et al. |
| 2021/0350167 A1 | 11/2021 | Wray et al. |
| 2021/0406298 A1 | 12/2021 | Rudden et al. |
| 2022/0028020 A1 | 1/2022 | Wray et al. |
| 2022/0076187 A1 | 3/2022 | Blum et al. |
| 2022/0138600 A1 | 5/2022 | Wray et al. |
| 2022/0156866 A1 | 5/2022 | Dua et al. |
| 2022/0245487 A1 | 8/2022 | Shen et al. |
| 2022/0374703 A1 | 11/2022 | Rigotti et al. |
| 2022/0375015 A1 | 11/2022 | Botteril et al. |
| 2022/0391725 A1 | 12/2022 | Wray et al. |
| 2023/0004941 A1 | 1/2023 | Yerastov et al. |
| 2023/0039710 A1 | 2/2023 | Moore et al. |
| 2023/0125711 A1 | 4/2023 | Li et al. |
| 2023/0245030 A1 | 8/2023 | Cai et al. |
| 2023/0259705 A1 | 8/2023 | Tunstall-Pedoe et al. |
| 2023/0297908 A1 | 9/2023 | Jagadeesan et al. |
| 2023/0350952 A1 | 11/2023 | Pedersen et al. |
| 2023/0394391 A1 | 12/2023 | Gandhi et al. |
| 2023/0394609 A1 | 12/2023 | Robinson et al. |
| 2024/0051128 A1 | 2/2024 | Neema et al. |
| 2024/0220852 A1 | 7/2024 | Cai et al. |
| 2025/0005532 A1 | 1/2025 | Cai et al. |

OTHER PUBLICATIONS

Office Communication for U.S. Appl. No. 17/888,920 mailed Sep. 14, 2023, 24 Pages.

Office Communication for U.S. Appl. No. 18/091,698 mailed Apr. 20, 2023, 47 Pages.

Office Communication for U.S. Appl. No. 18/091,698 mailed Aug. 31, 2023, 53 Pages.

Office Communication for U.S. Appl. No. 18/216,025 mailed Sep. 6, 2023, 14 Pages.

Office Communication for U.S. Appl. No. 17/385,054 mailed Nov. 6, 2023, 5 Pages.

Office Communication for U.S. Appl. No. 17/385,054 mailed Nov. 15, 2023, 2 Pages.

Office Communication for U.S. Appl. No. 17/587,413 mailed Nov. 14, 2023, 30 Pages.

(56) References Cited

OTHER PUBLICATIONS

Office Communication for U.S. Appl. No. 18/091,698 mailed Nov. 15, 2023, 5 Pages.
Office Communication for U.S. Appl. No. 17/888,920 mailed Jan. 11, 2024, 5 Pages.
Office Communication for U.S. Appl. No. 18/216,025 mailed Dec. 22, 2023, 15 Pages.
Office Communication for U.S. Appl. No. 17/888,920 mailed Jan. 23, 2024, 2 Pages.
Office Communication for U.S. Appl. No. 17/587,413 mailed Jan. 23, 2024, 5 Pages.
Office Communication for U.S. Appl. No. 18/091,698 mailed Feb. 1, 2024, 58 Pages.
Office Communication for U.S. Appl. No. 18/216,025 mailed Jan. 30, 2024, 4 Pages.
Office Communication for U.S. Appl. No. 18/486,498 mailed Jan. 18, 2024, 15 Pages.
"The big jobs debate: who's at risk from GenAI?" Mint, New Delhi, Aug. 13, 2023, 3 pages.
Office Communication for U.S. Appl. No. 17/587,413 mailed Feb. 13, 2024, 31 Pages.
Office Communication for U.S. Appl. No. 18/216,025 mailed Apr. 12, 2024, 13 Pages.
Office Communication for U.S. Appl. No. 18/486,498 mailed Mar. 14, 2024, 16 Pages.
Office Communication for U.S. Appl. No. 18/486,498 mailed May 6, 2024, 04 Pages.
Office Communication for U.S. Appl. No. 18/486,498 mailed Jun. 18, 2024, 14 Pages.
Office Communication for U.S. Appl. No. 17/587,413 mailed Jul. 10, 2024, 39 Pages.
Wang et al. "Knowledge-guided paraphrase identification." Findings of the Association for Computational Linguistics: EMNLP, Nov. 7-11, 2021, pp. 843-853.
Semnani et al. "WikiChat: Stopping the Hallucination of Large Language Model Chatbots by Few-Shot Grounding on Wikipedia." Findings of the Association for Computational Linguistics: EMNLP, Dec. 6-10, 2023, pp. 2387-2413.
Gao et al., "Modularized transformer-based ranking framework.", Oct. 6, 2020, 11 pages.
Office Communication for U.S. Appl. No. 18/091,698 mailed Jul. 25, 2024, 78 Pages.
Office Communication for U.S. Appl. No. 18/216,025 mailed Aug. 5, 2024, 13 Pages.
Office Communication for U.S. Appl. No. 17/587,413 mailed Sep. 19, 2024, 6 Pages.
Office Communication for U.S. Appl. No. 18/091,698 mailed Sep. 29, 2024, 4 Pages.
Office Communication for U.S. Appl. No. 18/768,550 mailed Sep. 26, 2024, 25 Pages.
"More than 80 New Products to Show at Next Week's HR Technology Conference & Exposition", NoticiasFinancieras, Miami, Oct. 4, 2017, pp. 1-7.
Alshanqiti et al., "Predicting Student Performance and Its Influential Factors Using Hybrid Regression and Multi-Label Classification," IEEE Access, Nov. 2020, vol. 8, pp. 203827-203844.
Dillenberger et al., "Blockchain Analytics and Artificial Intelligence," IBM Journal of Research and Development, 2019, pp. 1-13.
Gonzalez et al., "Automated Exercise Progression in Simulation-Based Training," IEEE Transactions on Systems, Man, and Cybernetics, Jun. 1994, vol. 24, No. 6, pp. 863-874.
Ludwigsen, Scott, "What Is Localization, and When Do You Need It?," Feb. 21, 2018, retrieved at: https://blog.languageline.com/what-is-localization, pp. 1-5.
Patel et al., "Using Multiple Models to Understand Data," In Proceedings of the Twenty-Second International Joint Conference on Artificial Intelligence—vol. 2 (IJCAI 2011), AAAI Press, Jul. 2011, 1723-1728.
Yanes et al., "A Machine Learning-Based Recommender System for Improving Students Learning Experiences," IEEE Access, Nov. 2020, vol. 8, pp. 201218-201235.
Office Communication for U.S. Appl. No. 16/691,479 mailed Feb. 19, 2021, 26 Pages.
Office Communication for U.S. Appl. No. 16/691,479 mailed Jun. 10, 2021, 36 Pages.
Office Communication for U.S. Appl. No. 16/691,479 mailed Jun. 25, 2020, 26 Pages.
Office Communication for U.S. Appl. No. 16/691,479 mailed Mar. 2, 2020, 22 Pages.
Office Communication for U.S. Appl. No. 16/691,479 mailed Sep. 11, 2020, 6 Pages.
Office Communication for U.S. Appl. No. 16/898,177 mailed Feb. 2, 2021, 5 Pages.
Office Communication for U.S. Appl. No. 16/898,177 mailed Feb. 23, 2021, 9 Pages.
Office Communication for U.S. Appl. No. 16/898,177 mailed Jul. 22, 2020, 12 Pages.
Office Communication for U.S. Appl. No. 16/898,177 mailed Jun. 18, 2021, 11 Pages.
Office Communication for U.S. Appl. No. 16/898,177 mailed Nov. 2, 2020, 13 Pages.
Office Communication for U.S. Appl. No. 16/898,177 mailed Sep. 1, 2021, 16 Pages.
Office Communication for U.S. Appl. No. 17/107,760 mailed Feb. 8, 2021, 35 Pages.
Office Communication for U.S. Appl. No. 17/107,760 mailed May 20, 2021, 8 Pages.
Office Communication for U.S. Appl. No. 17/384,577 mailed Jul. 11, 2022, 31 Pages.
Office Communication for U.S. Appl. No. 17/384,577 mailed Jun. 13, 2022, 5 Pages.
Office Communication for U.S. Appl. No. 17/384,577 mailed Mar. 22, 2022, 32 Pages.
Office Communication for U.S. Appl. No. 17/384,577 mailed Nov. 25, 2022, 29 Pages.
Office Communication for U.S. Appl. No. 17/384,577 mailed Nov. 26, 2021, 31 Pages.
Office Communication for U.S. Appl. No. 17/385,054 mailed Apr. 6, 2023, 4 Pages.
Office Communication for U.S. Appl. No. 17/385,054 mailed Jan. 30, 2023, 13 Pages.
Office Communication for U.S. Appl. No. 17/385,054 mailed Jul. 20, 2023, 12 Pages.
Office Communication for U.S. Appl. No. 17/385,054 mailed Jun. 20, 2022, 5 Pages.
Office Communication for U.S. Appl. No. 17/385,054 mailed Mar. 28, 2022, 43 Pages.
Office Communication for U.S. Appl. No. 17/385,054 mailed Nov. 19, 2021, 41 Pages.
Office Communication for U.S. Appl. No. 17/385,054 mailed Oct. 18, 2022, 48 Pages.
Office Communication for U.S. Appl. No. 17/492,527 mailed Apr. 29, 2022, 12 Pages.
Office Communication for U.S. Appl. No. 17/492,527 mailed Jan. 18, 2022, 11 Pages.
Office Communication for U.S. Appl. No. 17/492,527 mailed Jul. 15, 2022, 9 Pages.
Office Communication for U.S. Appl. No. 17/587,413 mailed Apr. 7, 2022, 27 Pages.
Office Communication for U.S. Appl. No. 17/587,413 mailed Aug. 9, 2022, 31 Pages.
Office Communication for U.S. Appl. No. 17/587,413 mailed Jul. 14, 2023, 28 Pages.
Office Communication for U.S. Appl. No. 17/587,413 mailed Mar. 20, 2023, 25 Pages.
Office Communication for U.S. Appl. No. 17/587,413 mailed May 18, 2023, 5 Pages.
Office Communication for U.S. Appl. No. 17/587,413 mailed Nov. 1, 2022, 5 Pages.
Office Communication for U.S. Appl. No. 17/587,413 mailed Nov. 22, 2022, 24 Pages.

(56) References Cited

OTHER PUBLICATIONS

Office Communication for U.S. Appl. No. 17/732,768 mailed Feb. 13, 2023, 4 Pages.
Office Communication for U.S. Appl. No. 17/732,768 mailed Jul. 14, 2023, 52 Pages.
Office Communication for U.S. Appl. No. 17/732,768 mailed Jul. 21, 2022, 44 Pages.
Office Communication for U.S. Appl. No. 17/732,768 mailed Mar. 22, 2023, 52 Pages.
Office Communication for U.S. Appl. No. 17/732,768 mailed Nov. 30, 2022, 48 Pages.
Office Communication for U.S. Appl. No. 17/732,768 mailed Oct. 13, 2023, 9 Pages.
Office Communication for U.S. Appl. No. 17/888,920 mailed Mar. 10, 2023, 24 Pages.
Office Communication for U.S. Appl. No. 17/888,920 mailed May 16, 2023, 4 Pages.
Office Communication for U.S. Appl. No. 17/587,413 mailed Nov. 20, 2024, 10 Pages.
Gugnani et al., "Generating Unified Candidate Skill Graph for Career Path Recommendation," 2018 IEEE International Conference on Data Mining Workshops (ICDMW), Singapore, 2018, pp. 328-333, Available at <Doi: 10.1109/ICDMW.2018.00054>.
Office Communication for U.S. Appl. No. 18/091,698 mailed Nov. 19, 2024, 47 Pages.
Office Communication for U.S. Appl. No. 18/216,025 mailed Oct. 11, 2024, 4 Pages.
Office Communication for U.S. Appl. No. 18/216,025 mailed Nov. 19, 2024, 19 Pages.
Office Communication for U.S. Appl. No. 18/893,741 mailed Nov. 26, 2024, 21 Pages.
Alibasic et al., "Evaluation of the trends in jobs and skill-sets using data analytics: a case study", Journal of Big Data, vol. 9, No. 32, 2022, 28 pages.
Anthropic, "Introducing the next generation of Claude", Available online at: <https://www.anthropic.com/news/claude-3-family>, Mar. 4, 2024, 11 pages.
Ao et al., "Skill requirements in job advertisements: A comparison of skill-categorization methods based on explanatory power in wage regressions1", Information Processing & Management, vol. 60, Issue 2, Mar. 2023, 30 pages.
Aufiero et al., "Mapping job fitness and skill coherence into wages: an economic complexity analysis", Scientific Reports, vol. 14, No. 11752, 2024, 18 pages.
Bansal et al., "Topic Modeling Driven Content Based Jobs Recommendation Engine for Recruitment Industry", ScienceDirect, Procedia Computer Science, vol. 122, 2017, pp. 865-872.
Burrus et al., Identifying the Most Important 21st Century Workforce Competencies: An Analysis of the Occupational Information Network (O*NET), ETS RR-13-21, Nov. 2013, 65 pages.
Chiang et al., "A Closer Look into Automatic Evaluation Using Large Language Models", ARVIX, Oct. 9, 2023, 15 pages.
European Commission, "European Skills, Competences, Qualifications and Occupations", ESCO handbook, Feb. 2019, 73 pages.
DeMark et al, "Enabling pathways to opportunity through a skills-based architecture", Competency-based Education, vol. 6, No. e1241, 2021, pp. 1-8.
Desmond et al, "EvaluLLM: LLM Assisted Evaluation of Generative Outputs", IUI Companion, Mar. 18-21, 2024, pp. 30-32.
Djumalieva et al., "An Open and Data-driven Taxonomy of Skills Extracted from Online Job Adverts", ESCoE, Aug. 2018, 76 pages.
Du et al, "Enhancing Job Recommendation through LLM-Based Generative Adversarial Networks", The 38th AAAI Conference on Artificial Intelligence, 2024, pp. 8363-8371.
Elekes et al., "Regional diversification and labour market upgrading: local access to skill-related high-income jobs helps workers escaping low-wage employment", Cambridge Journal of Regions, Economy and Society, vol. 16, 2023, pp. 417-430.
Fatemi et al., "Talk Like a Graph: Encoding Graphs for Large Language Models", ARVIX, Oct. 6, 2023, 23 pages.
Fettach et al., "Knowledge Graphs in Education and Employability: A Survey on Applications and Techniques", IEEE, vol. 10, 2022, pp. 80174-80183.
Maarten Grootendorst, "BERTopic: Neural topic modeling with a class-based TF-IDF procedure", Mar. 11, 2022, 10 pages.
Gurcan et al., "Big Data Software Engineering: Analysis of Knowledge Domains and Skill Sets Using LDA-Based Topic Modeling", IEEE, vol. 7, 2019, pp. 82541-82552.
Javed et al., "Large-Scale Occupational Skills Normalization for Online Recruitment", Proceedings of the 29th AAAI Conference on Innovative Applications, 2017, pp. 4627-4634.
Karakeben et al., "Rapid Graph Generation from Job Descriptions: combining Taxonomies and LLMs", ESWC, 2024, 5 pages.
Khaouja et al., "Building a soft skill taxonomy from job openings", Social Network Analysis and Mining, vol. 9, No. 43, Aug. 7, 2019, pp. 1-19.
Lin et al., "LLM-EVAL: Unified Multi-Dimensional Automatic Evaluation for Open-Domain Conversations with Large Language Models", ARVIX, May 23, 2023, 12 pages.
McInnes et al., "hdbscan: Hierarchical density based clustering", JOSS, vol. 2, No. 11, 2017, 2 pages.
McInnes et al., "UMAP: Uniform Manifold Approximation and Projection for Dimension Reduction", ARVIX, Sep. 18, 2020, 63 pages.
"GPT-4o mini: advancing cost-efficient intelligence", OpenAI, Jul. 18, 2024, 8 pages.
Rørheim et al., "Skill-relatedness and employment growth of firms in times of prosperity and crisis in an oil-dependent region", Economy and Space, vol. 54, No. 4, 2022, pp. 676-692.
Wei et al., "Chain-of-Thought Prompting Elicits Reasoning in Large Language Models", 36th Conference on Neural Information Processing Systems, Jan. 10, 2023, 43 pages.
Xiao et al., "C-Pack: Packed Resources For General Chinese Embeddings", SIGIR, Jul. 14-18, 2024, 9 pages.
Zhao et al., "Skill: A System for Skill Identification and Normalization", Proceedings of the 27th Conference on Innovative Applications of Artificial Intelligence, 2015, pp. 4012-4017.
Zinjad et al., "ResumeFlow: An LLM-facilitated Pipeline for Personalized Resume Generation and Refinement", SIGIR, Jul. 14-18, 2024, 5 pages.

* cited by examiner

800

802

Jane | P. | Doe
1234 | Spring | Street
Seattle | WA | 98101
Mobile | (123) | 123-1234

Education
2020 | Electrical | Engineering | (BSEE) | University | of | Washington
2018 | Pre | Engineering | (AS) | Bellevue | College

1002 — Jane | P. | Doe
1234 | Spring | Street
Seattle | WA | 98101
Mobile | (123) | 123-1234

1004 — Education

1006 — 2020 | Electrical | Engineering | (BSEE) | University | of | Washington
1008 — 2018 | Pre | Engineering | (AS) | Bellevue | College

DOCUMENT INGESTION PIPELINE

TECHNICAL FIELD

The present invention relates generally to data management, and more particularly, but not exclusively, to ingesting documents from various data sources.

BACKGROUND

Identifying persons that make good employees has long been a goal of organizations. And, in today's highly competitive global market, finding and keeping great employees is becoming more challenging. Conventionally, organizations may be forced to rely on narrow or limited criteria derived from anecdotal evidence, personal preferences, gut feelings, or the like, rather than evidence based analytics to determine if a person may be a good employee candidate. Likewise, students or other job seekers may employ ad-hoc methods for selecting education or training to obtain the skills desired by employers to obtain particular employment opportunities. In some cases, employers, educators, students, potential employees, or the like may rely on automated services for identifying candidates, evaluating education/training programs, evaluating/cataloging resumes, or the like. However, given the absence of standardized formats for resumes, transcripts, job descriptions, course descriptions, and so on, automated systems may require significant manual intervention to extract the information of interest from heterogeneous data sources or documents. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein:

FIG. 8 illustrates a logical representation of a document for document ingestion pipelines where the terms in a document have been determined in accordance with one or more of the various embodiments;

FIG. 10 illustrates a logical schematic of a document for document ingestion pipelines in accordance with one or more of the various embodiments;

DETAILED DESCRIPTION OF VARIOUS EMBODIMENTS

Figure 1:
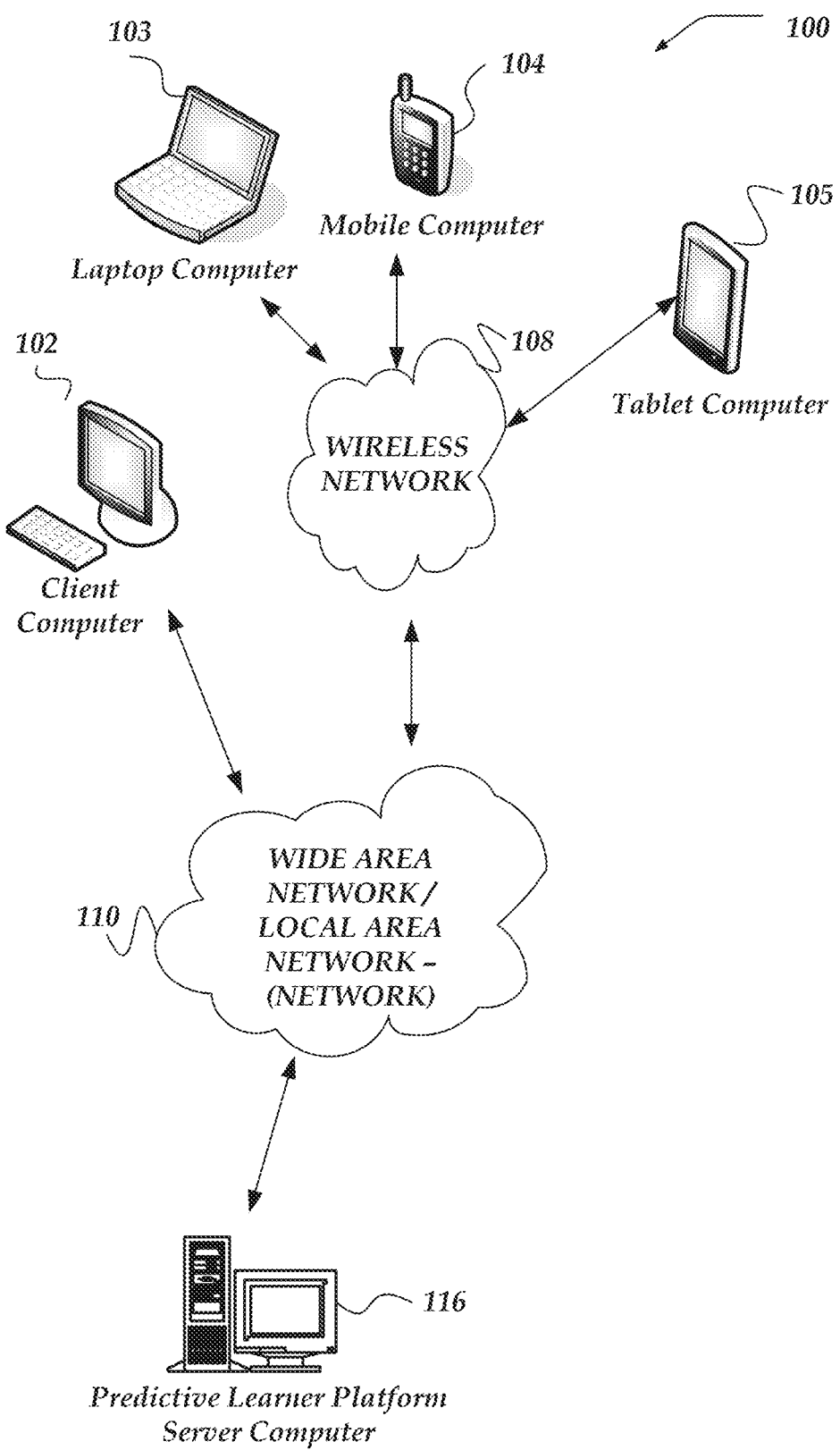
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on"

is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein, the term, "engine" refers to logic embodied in hardware or software instructions, which can be written in a programming language, such as C, C++, Objective-C, COBOL, Java™, PHP, Perl, JavaScript, Ruby, VBScript, Microsoft.NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the term "data source" refers to a service, system, or facility that may provide data to a data ingestion platform. Data sources may be local (e.g., on premises databases, reachable via a local area network, or the like) or remote (e.g., reachable over a wide-area network, remote endpoints, or the like). In some cases, data sources may be streams that provide continuous or intermittent flows of data to a data ingestion platform. Further, in some cases, data sources may be local or remote file systems, document management systems, cloud-based storage, or the like. Data sources may support one or more conventional or customer communication or data transfer protocols, such as, TCP/IP, HTTP, FTP, SFTP, SCP, RTP, or the like. In some cases, data sources may be owned, managed, or operated by various organizations that may provide data to a data ingestion platform. In some instances, data sources may be public or private websites or other public or private repositories that enable third parties to access hosted content.

As used herein, the term "raw data" refers to data provided by a raw data source. Raw data may include structured or unstructured data, documents, streams, or the like. Provided data may be considered as raw because the data source may provide the data in a form or format "as-is."

As used herein, the term "job" refers to a specific role or position that an individual performs in exchange for compensation or other consideration. Jobs typically involve a set of tasks, responsibilities, or duties that may contribute to the functioning of an organization, business, or industry. Jobs may vary significantly in terms of skill level, education requirements, working conditions, required skills, or remuneration.

As used herein, the terms "job description," or "job information" refer to a text based narrative that describes skill requirements, education requirements, responsibilities, activities, or the like, associated with one or more jobs, employment opportunities, occupations, or the like. Note, there may be other sources of similar information such as training descriptions, course descriptions, or the like, that describe skills, activities, responsibilities, requirements, or the like, that may be associated with a particular training program or course work. In the interest of brevity or clarity, herein the term job description should be interpreted to generally represent a text description that describes one or more of features, characteristics, responsibilities, skills, activities, or the like, associated with a particular job offering, training course, military occupational specialty, certification program, or the like.

As used herein, the term "layout graph" refers to one or more data structures that represent terms in a document and relationships between those terms. Each term in the document may be associated with a term node in the layout graph. Term nodes may initially be linked by edges in the layout graph to their nearest neighbors in reading order of the language used in document. Layout graphs may be partitioned based on the strength of the relationships between the term nodes included in the layout graph.

As used herein, the term "content shape" refers to a partition (portion) of a layout graph. Content shapes may be determined based on the removal of weak edges from the layout graph using multiple techniques including deterministic, clustering and one or more machine learning techniques.

As used herein, the term "content shape type," or "type" refer to types of content shapes that may be expected to include particular content or otherwise serve a particular purpose within a document.

As used herein, the term "classified content shape" refers to a content shape that have been associated with a content shape type.

As used herein, the term "chunk" refers to a collection of two or more related content shapes that may be grouped together based on their sequencing, relationship, or positioning in a document. For example, a list or table chunk may include a heading content shape and one or more record content shapes.

As used herein, the term "extraction model" refers one or more data structures that encapsulate the data, rules, machine learning models, machine learning classifiers, heuristics, or instructions that may be employed to extract information from classified content shapes. Extraction models may include various components, such as, one or more machine learning based classifiers, heuristics, rules, pattern matching, conditions, or the like, that may be employed to extract particular content that may be predicted to be included in particular classified content shapes.

As used herein, the terms "large language model," "generative artificial intelligence model," or "generative AI model" refer to data structures, programs, or the like, that may be trained or designed to perform a variety of natural language processing tasks. Typically, generative AI models may generate text responses in response to text based prompts. Often, generative AI models may be considered to be neural networks that have been trained on large collections of natural language source documents. Accordingly, in some cases, generative AI models may be trained to generate predictive responses based on provided prompts. Prompts may include context information, examples, or the like, that may enable generative AI models to generate responses directed to specific queries or particular problems that go beyond conventional NLP.

As used herein, the term "prompt" refers to one or more data structures that contain or represent prompt information that may be provided to generative AI models. Context information included in prompts may be considered to retrain generative AI models in realtime for answering questions included in the prompts.

As used herein, the term "configuration information" refers to information that may include rule based policies, pattern matching, scripts (e.g., computer readable instructions), or the like, that may be provided from various sources, including, configuration files, databases, user input, built-in defaults, plug-ins, extensions, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing data for document ingestion pipelines. In one or more of the various embodiments, a plurality of terms in a document may be determined based on a term location of each term within the document.

In one or more of the various embodiments, a layout graph that includes a plurality of term nodes may be generated based on the plurality of terms such that each of the plurality of terms corresponds to a different one of the plurality of term nodes and such that each term node may be linked by one or more edges to one or more neighboring term nodes.

In one or more of the various embodiments, one or more relationships between the plurality of term nodes may be determined based on a traversal of the layout graph such that the layout graph may be partitioned into one or more content shapes based on a strength of the one or more relationships.

In one or more of the various embodiments, the one or more content shapes may be classified to reduce computational resources for extracting information from the document based on one or more types associated with each content shape such that the one or more types may be associated with one or more extraction models that each support one or more of a plurality of different types of document formats, document sources, document platforms, or the like.

In one or more of the various embodiments, the one or more extraction models may be employed to extract information from the one or more classified content shapes such that the extracted information is stored in one or more data stores or included in one or more reports.

In one or more of the various embodiments, classifying the one or more content shapes many include, determining the type for each content shape based on one or more of a shape location of the one or more content shapes in the document, a proximity of the one or more content shapes to one or more previously classified content shapes, a match of content included in the one or more content shapes with one or more words or one or more phrases of the one or more terms associated with the content shape type, or the like.

In one or more of the various embodiments, classifying the one or more content shapes may include: generating one or more prompts that include one or more features associated with the one or more content shapes such that the one or more prompts may be provided to one or more generative artificial intelligence models and such that the one or more features may include one or more terms, one or more style features, one or more layout features, or the like; determining the one or more types for the one or more content shapes based on one or more responses from the one or more generative artificial intelligence models; or the like.

In one or more of the various embodiments, classifying the one or more content shapes may include: determining one or more patterns of a content included in the one or more content shapes such that the one or more geometric patterns may be associated with one or more of a list, a table, a heading, a footnote, a visualization, a sentence, a paragraph, or the like; determining the shape type based on one or more determined patterns of the content; or the like.

In one or more of the various embodiments, partitioning the layout graph into the one or more content shapes may include: determining a geometric distance between the one or more neighboring term nodes in the document based on the traversal of the layout graph; determining one or more text styling indicators in the document; pruning a portion of the one or more edges based on one or more of the geometric distance between the one or more neighboring term nodes exceeding a threshold value or the one or more text styling indicators; or the like.

In one or more of the various embodiments, a confidence score associated with each classified content shape may be determined such that the confidence score may be associated with a quality of a determination of the one or more types for each classified content shape. In some embodiments, a report that includes a portion of the one or more classified content shapes that are associated with a confidence score value that is lower than a threshold value may be generated.

In one or more of the various embodiments, a feature tree associated with the document may be determined based on a document type of the document. In some embodiments, feature nodes included in the feature tree may be compared with the one or more classified content shapes. In one or more of the various embodiments, a confidence score for the document for the one or more classified content shapes may be generated based on the comparison such that the confidence score and a number of feature nodes that match the one or more classified content shapes may be positively correlated. In some embodiments, the confidence score associated with the document may be reported or include in one or more reports.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, predictive learner platform server computer 116, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), extensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, predictive learner platform server computer 116, or other computers.

Client computers 102-105 may further be configured to include a client application that enables an end-user to log into an end-user account that may be managed by another computer, such as ingestion platform server computer 116, profile correlation server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by predictive learner platform server computer 116, or the like.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, predictive learner platform server computer 116, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of predictive learner platform server computer 116 are described in more detail below in conjunction with FIG. 3. Although FIG. 1 illustrates predictive learner platform server computer 116 as a single computer, the innovations or embodiments are not so limited. For example, one or more functions of predictive learner platform server computer 116 may be distributed across one or more distinct network computers. Moreover, in one or more embodiments, predictive learner platform server computer 116 may be implemented using a plurality of network computers. Further, in one or more of the various embodiments, predictive learner platform server computer 116, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
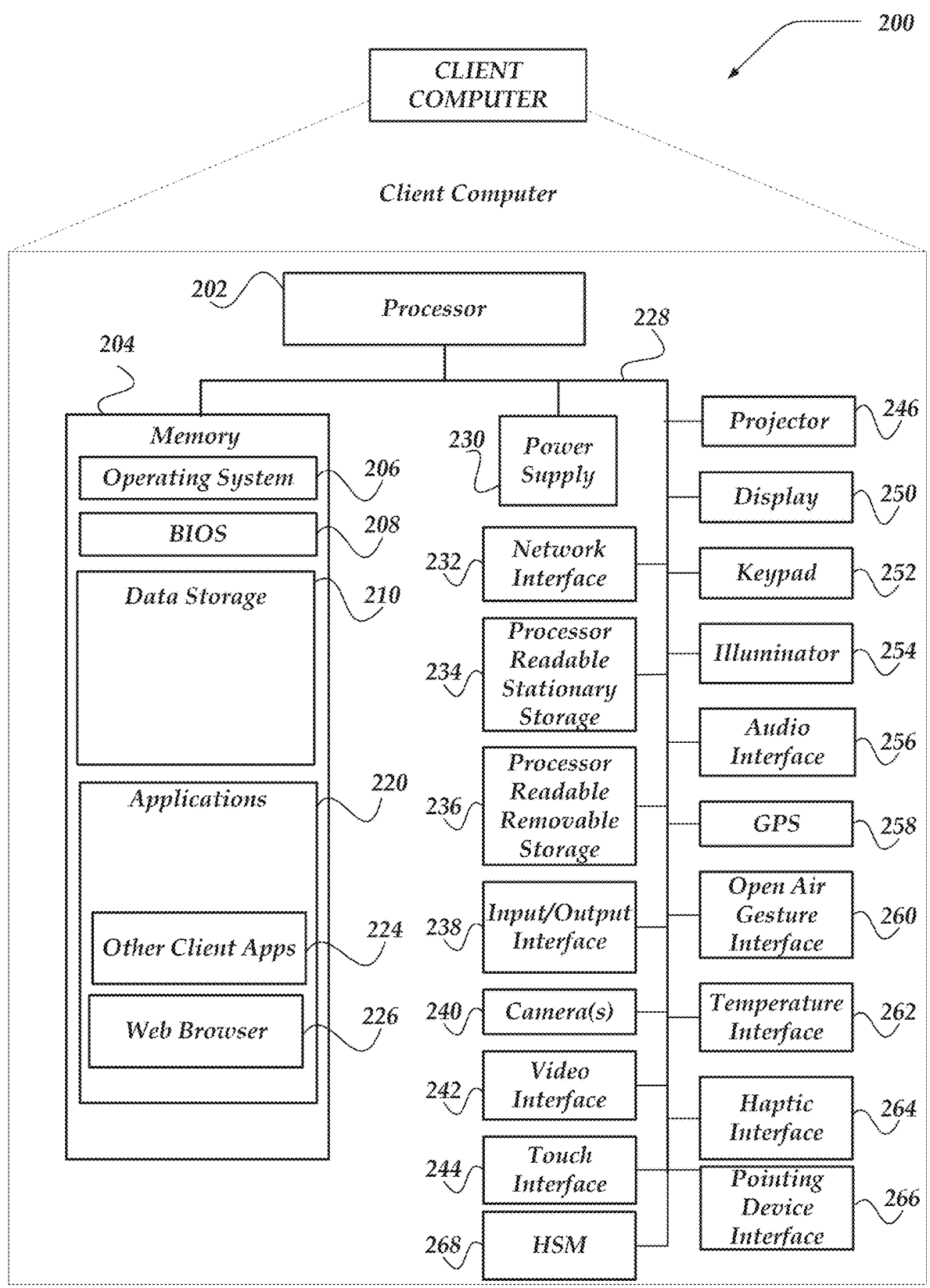
FIG. 2 illustrates a schematic embodiment of a client computer.

FIG. 2 shows one embodiment of client computer 200 that may include many more or less components than those shown. Client computer 200 may represent, for example, one or more embodiments of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery. Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back-light the buttons on keypad 252 and stay on while the client computer is powered. Also, illuminator 254 may back-light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over networks implemented using WiFi, Bluetooth™, Bluetooth LTE™, and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), extensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications with one or more servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, visualization applications, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
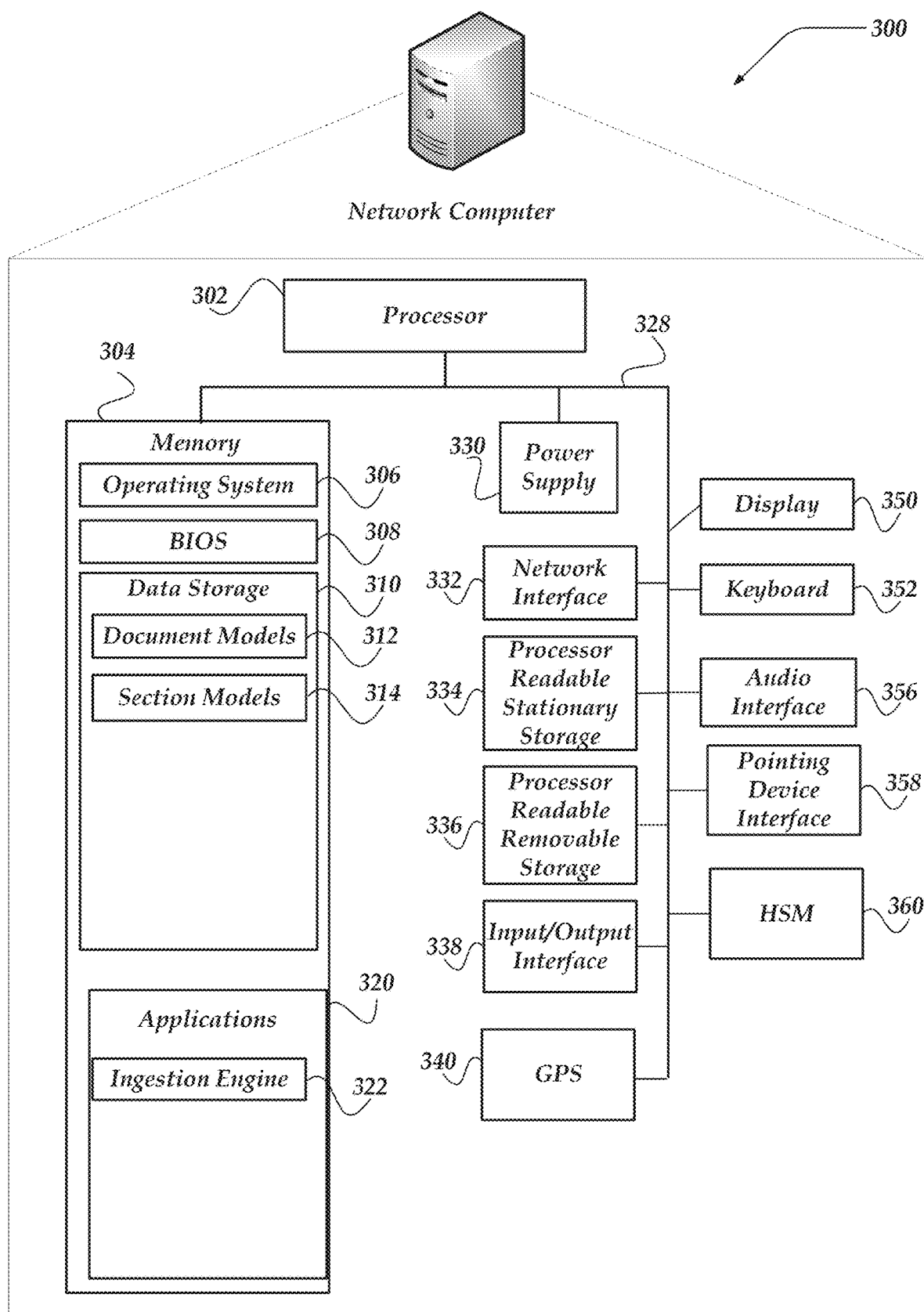
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one or more embodiments of a predictive learner platform server computer 116, or the like, of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, ingestion engine 322, skill engine 324, or the like, may be arranged to employ geo-location information to select one or more localization features, such as, time zones, languages, currencies, currency formatting, calendar formatting, or the like. Localization features may be used in user interfaces, dashboards, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or Linux®, or a specialized operating system such as Microsoft Corporation's Windows® operating system, or the Apple Corporation's macOS® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, friend lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, document models 312, section extraction models 314, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include ingestion engine 322, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, ingestion engine 322, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to ingestion engine 322, or the like, may be provisioned and de-commissioned automatically.

Also, in one or more of the various embodiments, ingestion engine 322, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
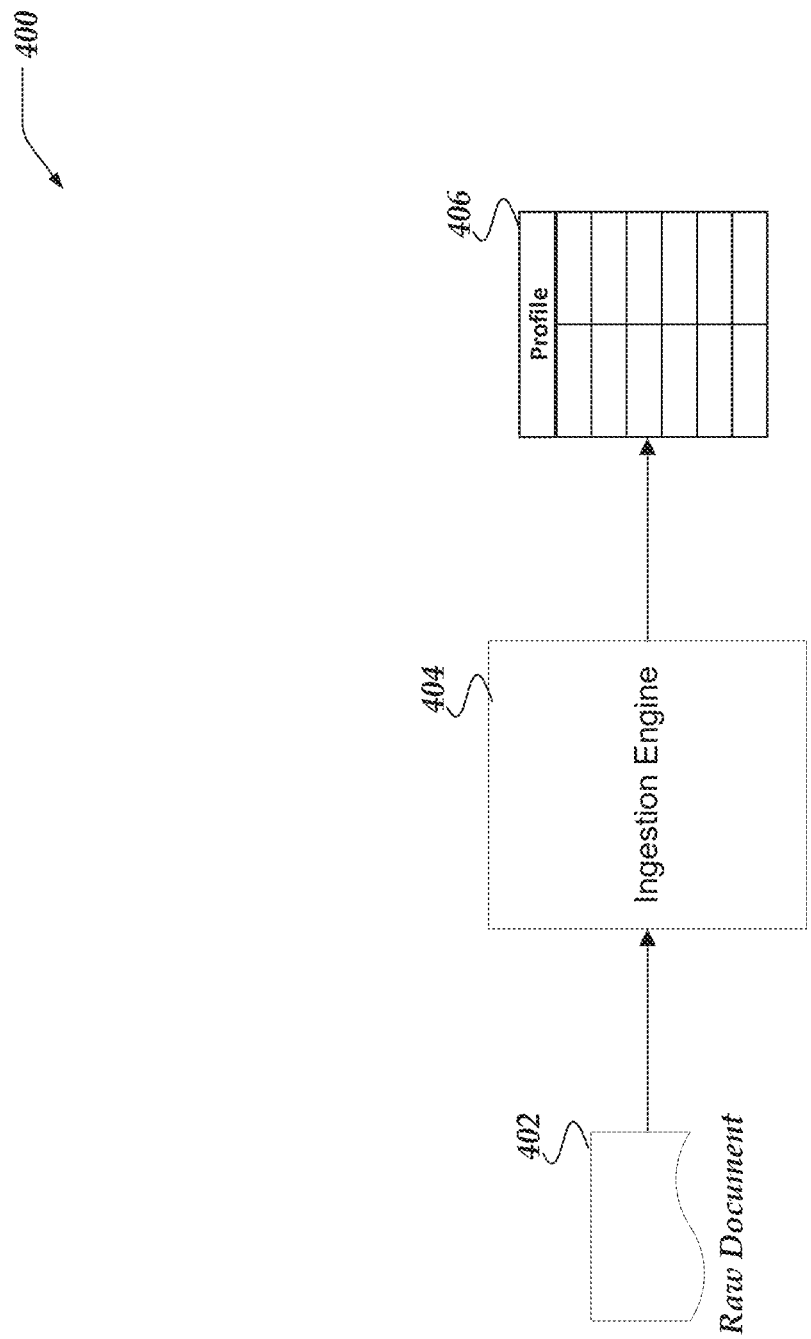
FIG. 4 illustrates a logical schematic of a system for document ingestion pipelines in accordance with one or more of the various embodiments.

FIG. 4 illustrates a logical schematic of system 400 for document ingestion pipelines in accordance with one or more of the various embodiments. In some embodiments, system 400 may be arranged to receive a raw document, such as, raw document 402. In some embodiments, raw documents may be collected or otherwise pre-processed by ingestion engines, such as ingestion engine 404. One of ordinary skill in the art will appreciate that ingestion engine 404 may represent one or more processes or facilities that intake raw data and prepare the raw data for analysis by other services.

In some embodiments, raw data may include documents that include information associated with the subject matter of interest. For example, raw data associated with learner platforms may include data associated with students, job seekers, current employees, job descriptions, educational resources, skills, skill descriptions, or the like. Accordingly, in some embodiments, raw documents may include job descriptions, training goal descriptions, educational course descriptions, certificate requirements, resumes, work histories, training histories, transcripts, or the like. In some embodiments, raw documents may be one or more entries included in government occupational indexes, college course catalogs, commercial industry job reports, or the like.

Also, in some embodiments, ingestion engines may be arranged to automatically pull raw documents from various repositories. For example, in some embodiments, ingestion engines may be integrated with job listing services, career counseling center systems, resume hosting services, government agencies, employment security agencies, corporate recruiting serves, training/educational organizations, or the like. In some embodiments, such integration may enable ingestion engines to automatically ingest raw data that includes relevant information.

In some embodiments, ingestion engines may be arranged to identify sections of documents that may be expected to include particular types of information. In some embodiments, sections may vary depending on the type of documents being processed or the type of information that may be of interest. For example, in some embodiments, resume documents may include sections such as, author profile, educational history, employment history, skills, or the like. Also, for example, other document types, such as transcripts may include sections such as educational institution, table/list of courses and grades, student profile information, student identity, or the like. Document sections may be referred to as content shapes and content shapes that have classified to match of particular content shape type may be referred to as classified content shapes.

Conventionally, automated document ingestion systems may rely on templates that may be rigidly configured or trained to match or identify particular documents from particular organizations. However, different organizations may provide documents that organize information in different ways. Also, in some cases, different departments or other sub-organizations may use different document formats or layouts for similar information. For example, two different departments at the same university may use different formats for syllabuses even though they are part of the same parent organization. In this example, conventional template based ingestion solutions may be required to develop or train separate/different template models for ingesting syllabuses from different departments. Thus, in many cases, the number of required template models (and the effort associated with creating or training template models) may disadvantageously increase without bound as more and more document formats may be encountered.

In contrast, in some embodiments, ingestion engines may be arranged to determine content shapes that may be included in documents independent of their particular location or format in a given document. Accordingly, in some embodiments, if content shapes may be determined in the document, ingestion engines may be arranged to classify the individual documents to determine their content shape type. Thus, in some embodiments, ingestion engines may employ the same classifiers for classifying content shapes regardless of the layout or format of the original document rather than having to train models or develop tools for each document format or document layout. For example, in some embodiments, ingestion engines may be arranged to determine the employment history content shapes in resumes independent of the overall format or layout of the resume document. For example, if a first resume lists an applicant's employment history before it lists their education history and a second resume has a layout that reverses the order of the employment history and education history, ingestion engines may employ that same to tools or models to identify or distinguish employment history content shapes from education history content shapes. Likewise, in some embodiments, ingestion engines may be arranged to employ the same or similar extraction models for pulling information out of classified content shapes because a classified content shape may expected to have certain kinds of content regardless of where it may have been located in the source document.

Figure 5:
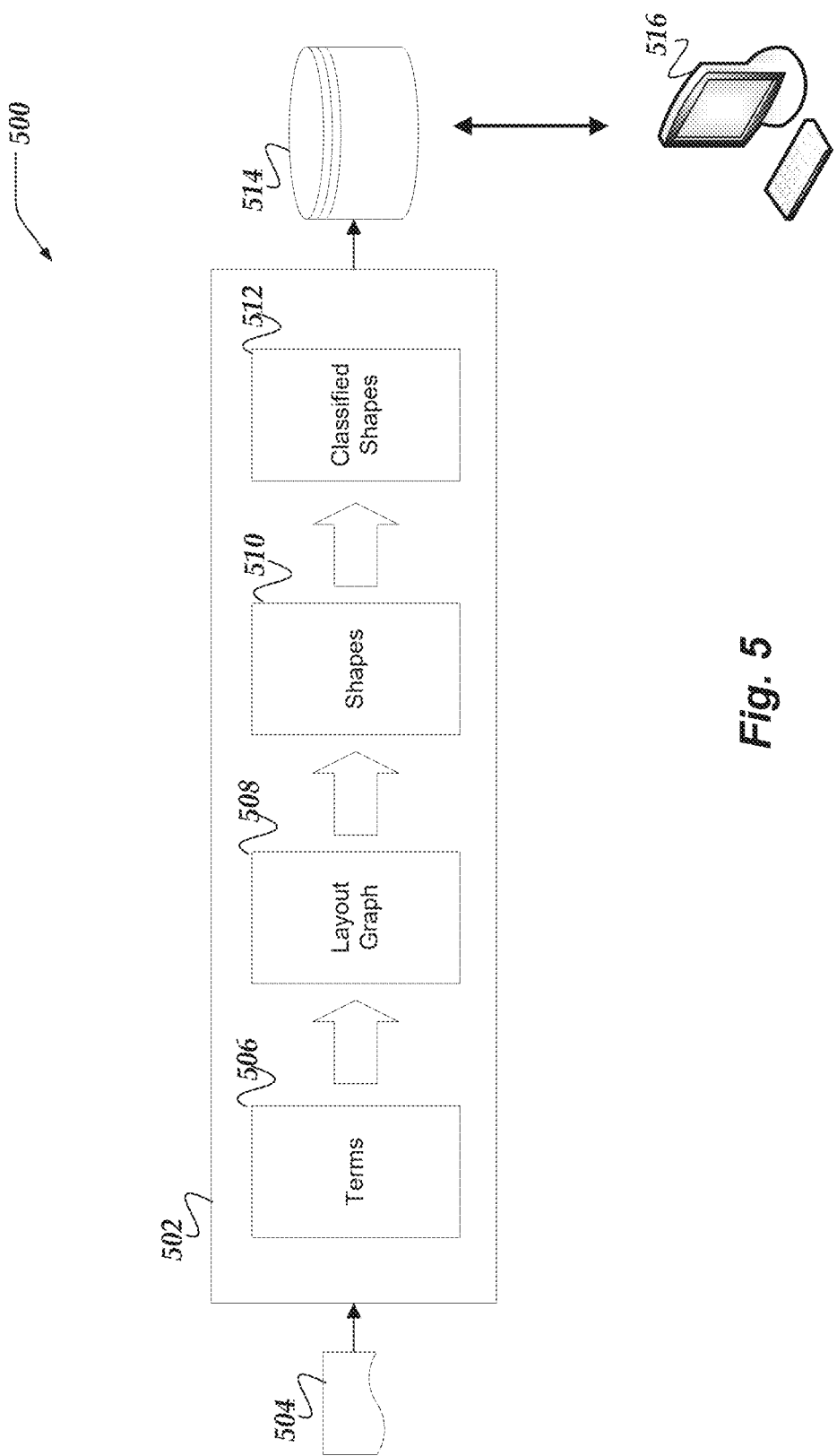
FIG. 5 illustrates a logical schematic of a pipeline for document ingestion pipelines in accordance with one or more of the various embodiments.

FIG. 5 illustrates a logical schematic of pipeline 500 for document ingestion pipelines in accordance with one or more of the various embodiments. In some embodiments, ingestion engines, represented here by ingestion engine 502, may be provided one or more documents, such as document 504. For example, for some embodiments document 504 may be a resume, transcript, job description, syllabus, course description, or the like. In this example, it may be assumed that document 504 may have been pre-processed using OCR, or the like, into a machine readable text format. Also, in some cases, document 504 may be provided in document format that may be inherently machine-readable, such as documents provided by commercial word processors (e.g., OpenDocument Format), HTML documents, PDF documents with machine-readable text, RTF files, XML files, database table dumps, query results from databases, or the like.

In some embodiments, ingestion engines may be arranged to determine the individual words or terms included in document 504. Accordingly, in some embodiments, terms 506 may be considered to represent an instantiation of document 504 where each word has been individually identified or located in document 504. In some embodiments, terms may be associated with geometric information associated with their location in the document. Accordingly, in some embodiments, ingestion engines may be arranged to generate logical bounding boxes around each determined word in the documents.

In some embodiments, ingestion engines may be arranged to generate an initial layout graph based on the terms in the document. In some embodiments, a layout graph may be a logical directed graph such that each term (or word) in the document may be considered a term node in the layout graph and relationships between the terms in the document may be considered edges of the layout graph.

In some embodiments, initially, ingestion engines may be arranged to link each word together with edges. In some embodiments, ingestion engines may be arranged to generate layout graphs that reflect how readers may normally be expected to read a document. For example, the document is in the English language, the layout graph may be a directed graph with edges that may be oriented from left to right, top to bottom, with respect to their location in the document. In this example, layout graph 508 represents a layout graph for document 504.

Accordingly, in some embodiments, ingestion engines may be arranged to subsequently prune the layout graph by removing weak edges based on one or more layout graph evaluations. For example, in some embodiments, ingestion engines may be configured determine relationships between terms that are geometrically separated (beyond a threshold value) from other terms as weak relationships. Thus, for example, if term A is more than four "spaces" away from term B, the edge linking term A to term B may be determined to be a weak link. Also, in some embodiments, other features or characteristics of terms or term relationships, including document layout properties, such as bounding regions, margin/border regions, font size, font style, other styling, or the like, may be evaluated to determine edges that should be pruned from the layout graph. Also, in some embodiments, relationships between layout objects, such as, table, table rows, table cells, lists, list items, or the like, may be evaluated to determined which edges may be pruned from layout graphs. Accordingly, in this example, ingestion engines may be arranged to remove one or more of the edges linking term A to term B. In some embodiments, ingestion engines may be arranged to employ one or more heuristics, instructions, rules, or the like, to evaluate the strength of a relationship between terms (term nodes) in a layout graph.

In some embodiments, ingestion engines may be arranged to determine one or more content shapes in the document based on an evaluation of the layout graph. Accordingly, in some embodiments, if weak edges may be pruned from the layout graph, there may be one or more separate graphs partitioned from the original layout graph. In some embodiments, partitions from the layout graph may be determined to be content shapes. In some embodiments, content shapes may include terms from the document that may be geometrically associated (clusters of term nodes) with other. In some embodiments, initial content shapes may correspond to different portions of a document that may include different types of information depending on the type of document. In this example, for some embodiments, content shapes 510 represent the content shapes generated from layout graph 508.

In some embodiments, if ingestion engines may generate one or more content shapes, ingestion engines may be arranged to classify the one or more content shapes into different types of content shapes based on the type of information that may be determined to be included in a given content shape. Accordingly, in some embodiments, ingestion engines may be arranged to label classified content shapes based on the type of information they may be predicted to include, for example, a resume document may include classified content shapes, such as applicant/author profile, educational history, skills, employment/career objectives, employment history, or the like. Likewise, for example, a transcript document may include classified content shapes that may include, student profile, student identity, course list, education institution profile, or the like.

In some embodiments, ingestion engines may be arranged to classify content shapes using one or more shape classifiers. In some embodiments, shape classifiers may include heuristics, rules, instructions, machine-learning models, generative AI prompts, or the like, that may be employed to classify content shapes based on various features of the content shapes, such as text content, proximity to other content shapes, patterns of content within content shapes, meta-data included in the source document, or the like. In this example, classified content shapes 512 may represent classified content shapes from document 504.

In some embodiments, ingestion engines may be arranged to store classified content shapes, documents, or other associated information in a data store such as data store 514. Accordingly, in some embodiments, the classified content shapes (along with their corresponding documents) may be made available for subsequent analysis.

Further, in some embodiments, ingestion engines may be arranged to employ one or more extraction models (not shown here) to extract particular information of interest from one or more of the classified content shapes and store the extracted information in databases, or the like. For example, document 504 may be a resume, the information extracted from classified content shapes may be used to generate a job applicant profile that includes various information extracted from the job applicant's resume, such as, name, address, educational level, educational history, degrees, professional licenses, certifications, employment history, declared skills, or the like.

For example, in some embodiments, if ingestion engines determine that a classified content shape is an employment history shape, the ingestion engine may employ one or more extraction models to pull out information that may be predicted to be in an employment history section of an applicant's resume. Note, in some embodiments, ingestion engines may be arranged to extract information from classified content shapes independent of the particular location of the of the information within the original document because extraction models may be configured for extracting information from particular classified content shapes rather than depending on the overall formatting of the original documents. For example, in some embodiments, employment history content shapes for different resumes with different formats or layouts may be determined whether they appear in different locations in the different resumes.

For example, in some embodiments, a client, such as, client 516 may be enabled to submit various queries regarding the documents, classified content shapes, document subjects, For example, predictive learner platforms may provide applications, websites, or the like, that enable users to generate or submit various queries associated with students, job applicants, jobs, or the like, that may be answered based on information extracted from relevant classified content shapes.

Figure 6:
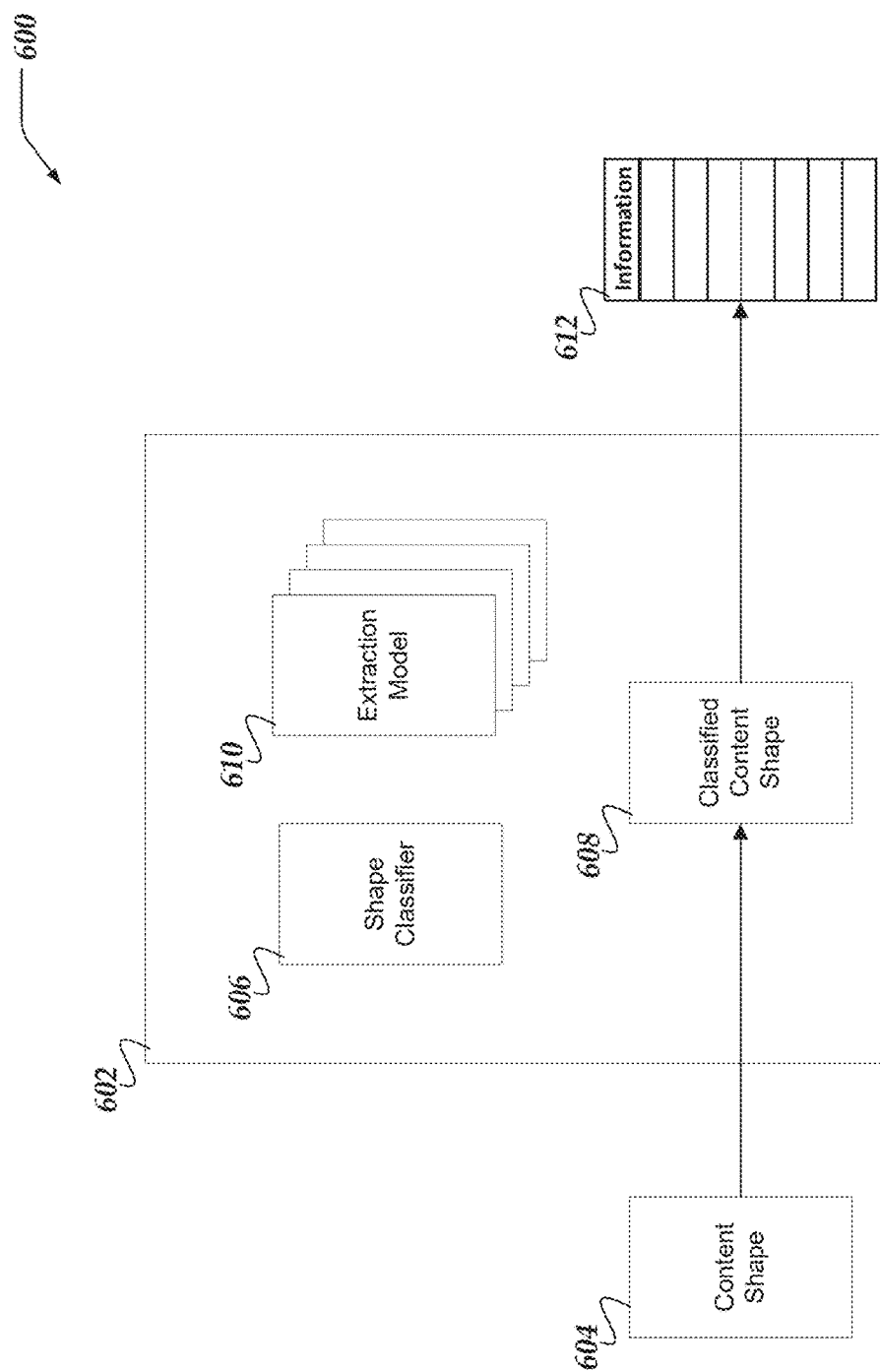
FIG. 6 illustrates a logical schematic of a system that may be portion of a document ingestion pipeline in accordance with one or more of the various embodiments.

FIG. 6 illustrates a logical schematic of system 600 that may be portion of a document ingestion pipeline in accordance with one or more of the various embodiments. In this example, system 600 may be considered to represent a portion of an ingestion engine that may be arranged to classify content shapes or extract information from classified content shapes.

As described above, in some embodiments, ingestion engines may be arranged to determine one or more content shapes that may be included in a document. At this point content shapes may be unassociated with particular content shape types, or the like. Because in some embodiments, content shape 604 may be determined based on an analysis of a layout graph or partitioning of the layout graph independent of semantic meaning of its contents.

Accordingly, in some embodiments, ingestion engines may be arranged to classify content shape 604 based on analysis of various features of the content shape, such as contents, location in the original document, meta-data from the original documents, proximity to other classified content shapes in the original documents, or the like. In some embodiments, ingestion engines may be arranged to employ one or more shape classifiers, such as shape classifier 606 for classifying content shapes. In some embodiments, shape classifiers may be arranged to perform one or more recognition operations to predict the classification for a shape. In some embodiments, ingestion engines may be arranged to associate one or more conditions, rules, heuristics, generative AI prompts, machine-learning models, or the like, with different types of classifications. For example, in some embodiments, resume applicant profile content shapes may be predicted to include information about the applicant that is the subject of the resume document. Accordingly, in this example, a shape classifier may be arranged to look for features such as first names, last names, address information, telephone numbers, or the like, that may be expected to be in a applicant's profile section of a resume. Also, in some cases, other features such as location in the document or proximity to other classified content shapes may be considered. For example, in some embodiments, if a content shape that includes applicant information is located near the top of a resume document, the shape classifier may further predict that the content shape may be classified as a applicant profile content shape.

In some embodiments, shape classifiers may be arranged to employ two or more rules, conditions, evaluations, generative AI prompts, machine-learning models, or the like, that may each contribute to a confidence score associated with the prediction of the content shape type. Accordingly, in some embodiments, if a confidence score exceeds a threshold value, ingestion engines may be arranged to consider a content shape as a classified content shape. For example, in some embodiments, determining application information (e.g., name, address, telephone) that may be included in a content shape may result in a partial confidence score and if the content shape may be located at the top of the resume document another partial score may be added to the overall confidence score for that classified content shape.

Accordingly, in some embodiments, ingestion engines may be arranged to assign a classification confidence score to each classified content shape.

In some embodiments, if content shapes may be classified, ingestion engines may be arranged to extract information from the classified content shapes. Accordingly, in some embodiments, ingestion engines may be arranged to employ one or more extraction models, such as extraction models 610 for determining and extracting information from the contents of the classified content shapes.

In some embodiments, extraction models may be directed to one or more types of classified content shapes. For example, in some embodiments, one or more extraction models may be directed to extracting employment history information from content shapes classified as employment history content shapes. Also, for example, other extraction models may be directed to other types of content shapes, such as, applicant profile, employment descriptions, employment skill requirements, transcript course history records, class/course descriptions, or the like.

Further, in some embodiments, ingestion engines may be arranged to be adaptable to processing or encountering different or new types of classified content shapes. Accordingly, in some embodiments, additional extraction models may be provided for different or new content shape classifications.

Accordingly, classifying the one or more content shapes reduces computational resources for extracting information from documents based on one or more content shape types associated with each content shape such that the one or more content shape types may be associated with one or more extraction models that each support one or more of a plurality of different types of document formats, document sources, and document platforms rather than requiring the use or training specialized models for each of the plurality of different types of document formats, document sources, or document platforms. For example, an extraction model directed to extracting information from particular content shape type may be used even the source document may be significantly different from other documents at least because content shapes that may be classified to a particular content shape type may be expected to include terms that may be associated with a limited number of concepts no matter where they may be located in the document.

Also, in some embodiments, ingestion engines may be arranged to monitor the performance of extraction models to determine if one or more extraction models may be a candidate for retraining. In some embodiments, two or more extraction models directed to the same type of classified content shapes may be employed at the same time such than an ingestion engine may supervise their extractions to compare the information extracted from the different extraction models on the same content shape. Accordingly, in some embodiments, ingestion engines may be arranged to compare the results of the different extraction models to determine if one or more extraction models may be performing better than another. Accordingly, in some embodiments, if an extraction model may be associated with a performance score that falls below a threshold value, ingestion engines may be arranged to automatically withdraw the poor performing extraction models from production and automatically substitute them with them another extraction model that may have better performance scores.

In this example, for some embodiments document profile 612 may represent a collection of information extracted from classified content shapes. For example, information extracted from an application profile content shape from a resume may include information, such as first name, last name, physical address, mailing address, home telephone number, mobile telephone number, birthday date, or the like. Note, in some embodiments, not every classified content shape of a particular type will have the same amount of information. Accordingly, in some embodiments, one or more fields in document profiles, such as, document profile 612 may be missing or have no values. Also, in some embodiments, criteria for classifying content shapes as a particular classified content shape may include one or more required fields. For example, a student profile content shape may be expected to include at least a student's first name and last name. Thus, for example, if the extraction models for that classified content shape fails to determine name information (e.g., first name, last name, and so on) in a predicted student profile content shape, that content shape may be excluded by rule (because a student name could not be found) from being considered a student profile content shape.

Also, in some embodiments, ingestion engines may be arranged to ingest various documents (or other raw data) to generate one or more document profiles, such as document profile 612 that offer an efficient compact representation of the concepts or other particular information that may be included the documents. For example, in some embodiments, document profiles, such as document profile 612 may be indexed using B-trees, or the like, to facilitate fast/performant searches of documents, document information, or the like. For example, in some embodiments, document profile 612 may include one or more name value pairs that the represent particular information extracted by one or more extraction models. Thus, in some embodiments, document profiles, such as document profile 612 may be considered to represent an efficient 'data sketch' complete documents. Note, in some embodiments, ingestion engines may be arranged to include a reference to the original source documents in document profiles. Accordingly, in some embodiments, predictive learner platforms may be arranged to employ indexes of document profiles to execute performant searches based on the fields or values extracted from the document while upon completion of the search using the document profile the original document (or a copy thereof) may be obtained as needed.

In some embodiments, ingestion engines may be arranged to determine confidence scores associated with extracted information or one or more individual fields that include extracted information that may be part of document profiles such as document profile 612. Accordingly, in some embodiments, downstream services of predictive learner platforms may be configured to employ those confidence scores in various contexts. For example, if a student profile includes a student name indicated as being a low confidence prediction, the predictive learner platform may employ other information sources to attempt to validate the predicted student name (e.g., educational organizations student databases, or the like).

In some embodiments, information extracted from content shapes and included in data structures, such as document profile 612 may be stored in various data stores, used to generate indexes, or the like, to support queries or other data processing that may be associated with extracted information, the documents, or persons or other subjects that may be associated with the documents.

Figure 7:
FIG. 7 illustrates a logical representation of a document for document ingestion pipeline in accordance with one or more of the various embodiments.

FIG. 7 illustrates a logical representation of document 700 for document ingestion pipeline in accordance with one or more of the various embodiments. As described above, different types of documents may be processed by ingestion engines. In this example, document 700 may be considered to be a portion of a resume, such that it includes some basic information about the applicant/author of the resume and a limited synopsis of the person's educational background. One of ordinary skill in the art will appreciate that actual production documents, including resumes, transcripts, job descriptions, course descriptions, course syllabuses, or the like, may include more information than may reasonably represented in this example. Accordingly, for brevity and clarity document 700 is deliberately represented with much less information that may occur in actual resumes.

FIG. 8 illustrates a logical representation of document 800 for document ingestion pipelines where the terms in document 800 have been determined. In this example, the identified terms are represented by illustrating a bounding box around each term. As described above, ingestion engines may be arranged to determine the terms in a document as part of generating a layout graph. Accordingly, in this example, for some embodiments, each bounded term, such as bounded term 802 may be represented in a layout graph by a corresponding term node.

In some embodiments, ingestion engines may be arranged to associated various information, metrics, meta-data, or the like, with each term node. For example, in some embodiments, ingestion engines may be arranged to record the geometric location of the terms in terms of X and Y coordinates, row and column coordinates, or the like. Also, in some embodiments, ingestion engines may be arranged to collect additional information associated with terms, such as font type, font size, styling information, CSS classes or style information, or the like, to associate with term nodes.

Figure 9:
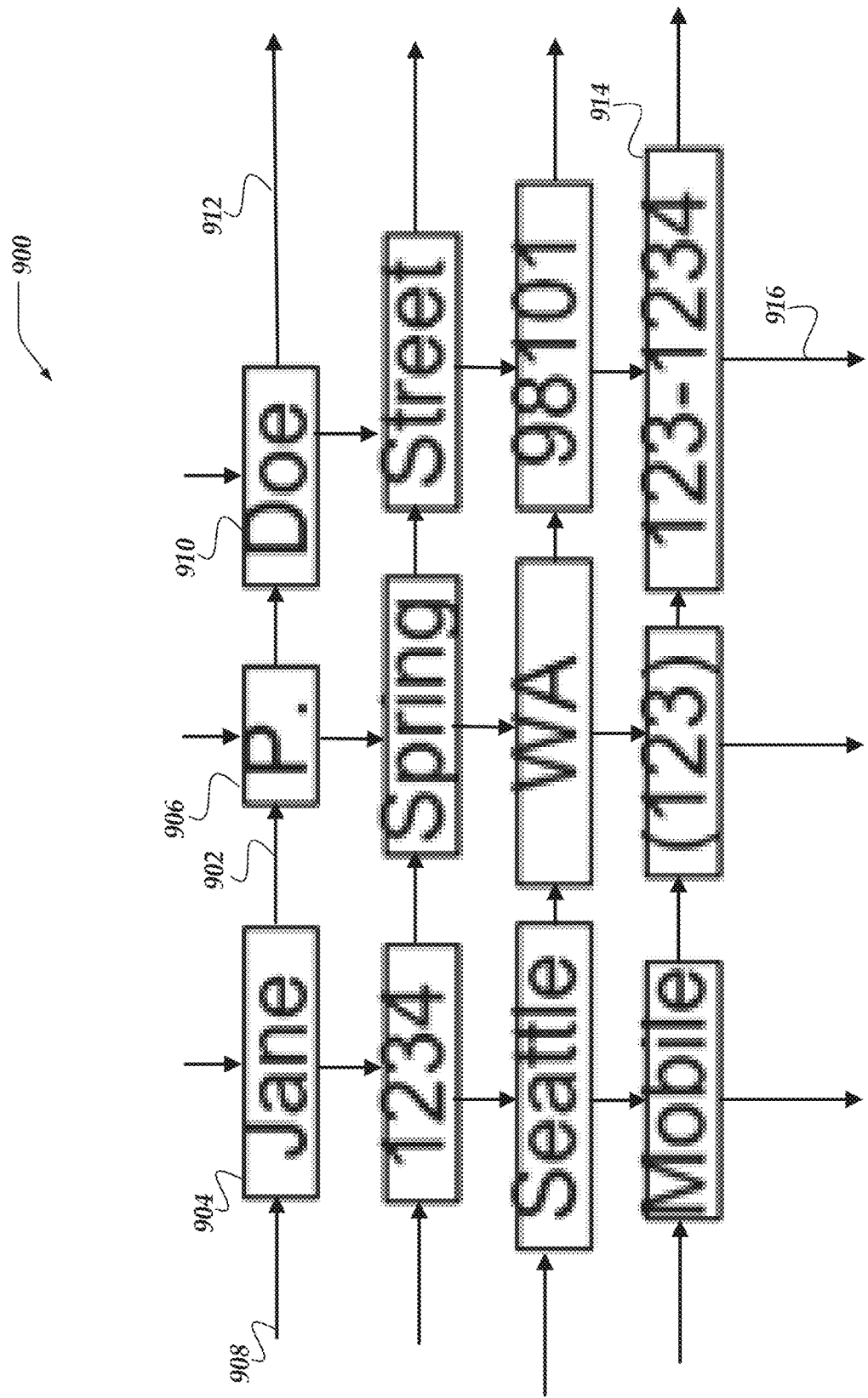
FIG. 9 illustrates a logical representation of a layout graph portion for document ingestion pipelines in accordance with one or more of the various embodiments.

FIG. 9 illustrates a logical representation of layout graph portion 900 for document ingestion pipelines in accordance with one or more of the various embodiments. As described above, in some embodiments, ingestion engines may be arranged to generate layout graphs from terms included in documents. In some embodiments, if terms in the document may be determined, ingestion engines may be arranged to generate a term node for the layout graph for each term with one or more edges that may be associated with one or more relationships between or among term nodes. In some embodiments, ingestion engines may be arranged to link each node with one or more edges that may be associated with one or more relationships between or among term nodes in the layout graph.

In this example, for some embodiments, edges may be directed (in a direction) in accordance with the underlying language. Accordingly, for example, if documents may be in the English language, edges in the layout graph may be directed left to right and top to bottom which corresponds to the natural reading order of documents in the English language. Also, in some embodiments, layout graphs for documents in right-to-left script languages, such as, Hebrew, Arabic, Persian, or the like, may have their edges in the layout graph directed from the right-to-left.

In some embodiments, the initial layout graph may include edges that link every term node to its nearest node (in its script direction) as well as to top to bottom.

In this example, for some embodiments, edge 902 represents an edge in the layout graph linking the term node 904 with term node 906. Also, in this example, edge 908 represents an edge that links term node 904 with another term node that for brevity is not shown here. Likewise, in this example, edge 912 may represent an edge coming from term node 910 that may link with another term node that may be not shown here. Similarly, in this example, edge 916 may be assumed to link term node 914 to a term node that is below and not shown here.

In some embodiments, ingestion engines may be arranged to generate the initial layout graph absent analysis or prediction of where shapes may be or what type of content may be associated by the edges. Accordingly, in some embodiments, ingestion engines may be arranged to iterate through terms in the document in reading order, generate a term node for each encountered term and edges linking them to their neighbor.

In some embodiments, the initial edges may be associated with one or more metrics, such as the geometric information that corresponds to how the terms may appear in the document. In some cases, additional information such as page crossing indicators, or the like, may be associated with edges if they may be encountered.

FIG. 10 illustrates a logical schematic of document 1000 for document ingestion pipelines in accordance with one or more of the various embodiments. As described above, the initial layout graph may include edges that link each term node, such that each term node in the document may be included in the same partition of layout graph.

In some embodiments, ingestion engines may be arranged to evaluate the strength of the relationships between term nodes to determine one or more weak relationships, if any. Accordingly, in some embodiments, ingestion engines may be arranged to remove (prune) edges from the layout graph that may be associated with weak relationships.

In some embodiments, ingestion engines may be arranged to determine which edges to remove from the layout based on an evaluation of the metrics or meta-data associated with the term nodes and the edges. In some embodiments, ingestion engines may be arranged to be adaptable to different types of documents or different types of content shapes. Accordingly, in some embodiments, ingestion engines may be arranged to employ rules, heuristics, conditions, or the like, provided via configuration information to account for local circumstances or local requirements. For example, as different types of documents or content shapes may be encountered the evaluation processes may be adapted or updated if needed.

In some embodiments, in some cases, some weak relationships may be determined based on the distance between term nodes. For example, if there may be separation distance between term nodes that exceeds a threshold value, ingestion engines may predict that the separated term nodes may be in different content shapes. In general, in some embodiments, ingestion engines may be arranged to execute one or more evaluation actions to identify clusters of term nodes in the layout graph that may be grouped into content shapes. In some embodiments, given that the terms and layout of the document may be represented by the layout graph, ingestion engines may be arranged to execute one or more evaluations to partition the layout graph into one or more separate content shapes. As mentioned above, geometric locations of the terms in the document may be used as part of the partitioning. However, additional features from the document, such as meta-data may be used as well. For example, if two different paragraphs in the original document may be associated with different style classes, ingestion engines may be arranged to employ that information to weight its prediction that the paragraphs may be associated with different content shapes.

Also, in some embodiments, ingestion engines may be arranged to examine the layout graph for partitions (e.g., content shapes) based on structural features of the layout. In some embodiments, ingestion engines may be arranged to identify blobs of text, lists of records, columns of data, or the like, to predict content shapes based on the layout graph. Accordingly, in some embodiments, ingestion engines may be arranged to employ rules, heuristics, conditions, pattern matching, or the like, provided via configuration information for detecting structural layout information. For example, in some embodiments, ingestion engines may be arranged to detect lists of records by determining term nodes that may be arranged in list-like arrangements by examining if the term nodes are arranged with regular spacing between one or few sentences. Also, other features, like list item bullets, list numbering, or the like, may be applied to determine that a content shape may be a list of records.

In some embodiments, ingestion engines may be enabled to employ machine-learning classifiers that have been trained to recognize structural formats of content shapes.

In this example, for some embodiments, document 1000 includes content shape 1002 and content shape 1004. In some embodiments, content shapes may be comprised of one or more term nodes. In this example, for brevity and clarity explicit reference numbers and graph edges are omitted from the term nodes included in each content shape.

Also, in some embodiments, one or more content shapes may be embedded or nested in within content shapes. Accordingly, in this example, for some embodiments content shape 1006 and content shape 1008 may represent content shapes that may be embedded in content shape 1004.

Note, the content shapes (e.g., content shape 1002-1008) shown here are indicated using dashed lines for emphasis or clarity rather than an indication of being optional components.

In some embodiments, if ingestion engines determine the content shapes, as described above, ingestion engines may be arranged to classify the content shapes. Accordingly, in some embodiments, ingestion engines may be arranged to evaluate the content of content shapes as well as internal structures to classify the content shape as one or more content types.

In some embodiments, the particular content types or content shape types may vary depending on the type of document. In some cases, for some embodiments, ingestion engines may be arranged to generally classify content shapes independently based on their included contents or internal structure.

In some embodiments, classifying content shapes may be based on predicted or expected words, phrases, or the like, that may be included in content shapes. Likewise, in some embodiments, ingestion engines may be arranged to disqualify content shapes from some classification based on the presence of unexpected words or phrases that may be configured to be disqualifying.

In some embodiments, ingestion engines may be arranged to disqualify content shapes that it fails to classify. In some embodiments, ingestion engines may be arranged to track which content shapes it failed to classify. Accordingly, in some embodiments, ingestion engines may be arranged to provide one or more user interfaces that enable users to review the failed-to-classify content shapes to enable users to manually classify the content shapes if possible. Note, failing to classify a content shape may be considered to be different or separate from disqualifying content shapes. In some embodiments, disqualified content shapes may be content shapes that ingestion engines predict to be irrelevant or redundant depending on the type of documents being processed. For example, for some type of documents may include cover sheets, title pages, page numbers, repeating footer content, header content, or the like, that may result in content shapes that ingestion engines may be configured to be disqualify.

In some embodiments, shape classification may include semantic analysis, NLP, or the like, to test if the terms included in the content shape conform to information that may be expected. In some cases, testing for particular words or types of words included in content shapes may be a significant or partial condition for classifying content shapes. Likewise, in some embodiments, ingestion engines may be arranged to examine if patterns of words or phrases (e.g., telephone numbers, addresses, date ranges, or the like) may be present. In some embodiments, the presence of particular words, word patterns, or the like, may indicate that a content shape may be classified as a particular type of content shape. For example, if the content shape includes date ranges, that may be indicative of an employment history or educational experience content shapes. Likewise, keywords or key phrases, such as 'Bachelor of Science', BSEE (Bachelor of Science in Electrical Engineering), Masters, Supervised, project manager, or the like, may be indicative of particular classifications of content shapes. For example, finding the phrase Bachelor of Science in a content shape may indicate that the content shape includes educational history. Similarly, for example, finding the phrase 'project manager' in a content shape may indicate that the content shape includes employment history. Further, in some embodiments, shape classifiers in ingestion engines may be arranged to be adaptable to recognizing additional or new words or phrases in anticipation of changing vocabulary, new jobs, new skills, or the like. Accordingly, in some embodiments, ingestion engines may be arranged to employ rules, word lists, filters, conditions, or the like, provided via configuration information to enable ingestion engines to adapt to changes in word usage, new or changing career types, new or changing educational/training practices, or the like.

Further, in some embodiments, shape classifiers may be adaptable to particular career environments or educational programs, such as universities programs, skilled trade training programs, military education/training programs, or the like. For example, in some embodiments, shape classification of documents associated with military education or military work history may be adapted to search for military nomenclature that may be different than used for processing civilian education information. Also, in some embodiments, shape classifiers directed to other career areas or education focus areas, such as health care, finance, law/legal, software engineering, or the like, may include specialized rules or word sets/dictionaries to aid in the classification of associated content shapes.

Note, in some embodiments, shape classifiers specialized for particular types of content may be used for processing documents from multiple sources even if those different sources use different documents formats, including different placements or arrangements of the content shapes in the documents because the content shapes may be evaluated independently from the document as a whole. For example, in some embodiments, a shape classifier configured to recognize personally identifiable information (PII) may be employed for resumes, transcripts, credential/certificate documents, or the like, without requiring retraining or re-tuning. In contrast, a conventional template based document ingestion system may be required to use different criteria for differently formatted documents because of the absence of isolating content shapes before classifying them.

In some embodiments, ingestion engines may be arranged to perform more than one test or evaluation of the content included in content shapes such that each test or evaluation may contribute a partial confidence score. Accordingly, in some embodiments, if the sum of one or more partial confidence scores exceeds a threshold value, the content shape may be determined to be classified.

Also, in some embodiments, ingestion engines may be arranged to generate generative AI prompts that include the content of content shapes. Accordingly, in some embodiments, ingestion engines may be arranged to submit these prompts to generative AI to predict if the content included in a content shape may conform to one or more classifications.

In some embodiments, the results of two or more methods of classifying content shapes may be compared against each other. Accordingly, in some embodiments, if the predictions diverge, the confidence score associated with the classified content shapes may be reduced.

Figure 11:
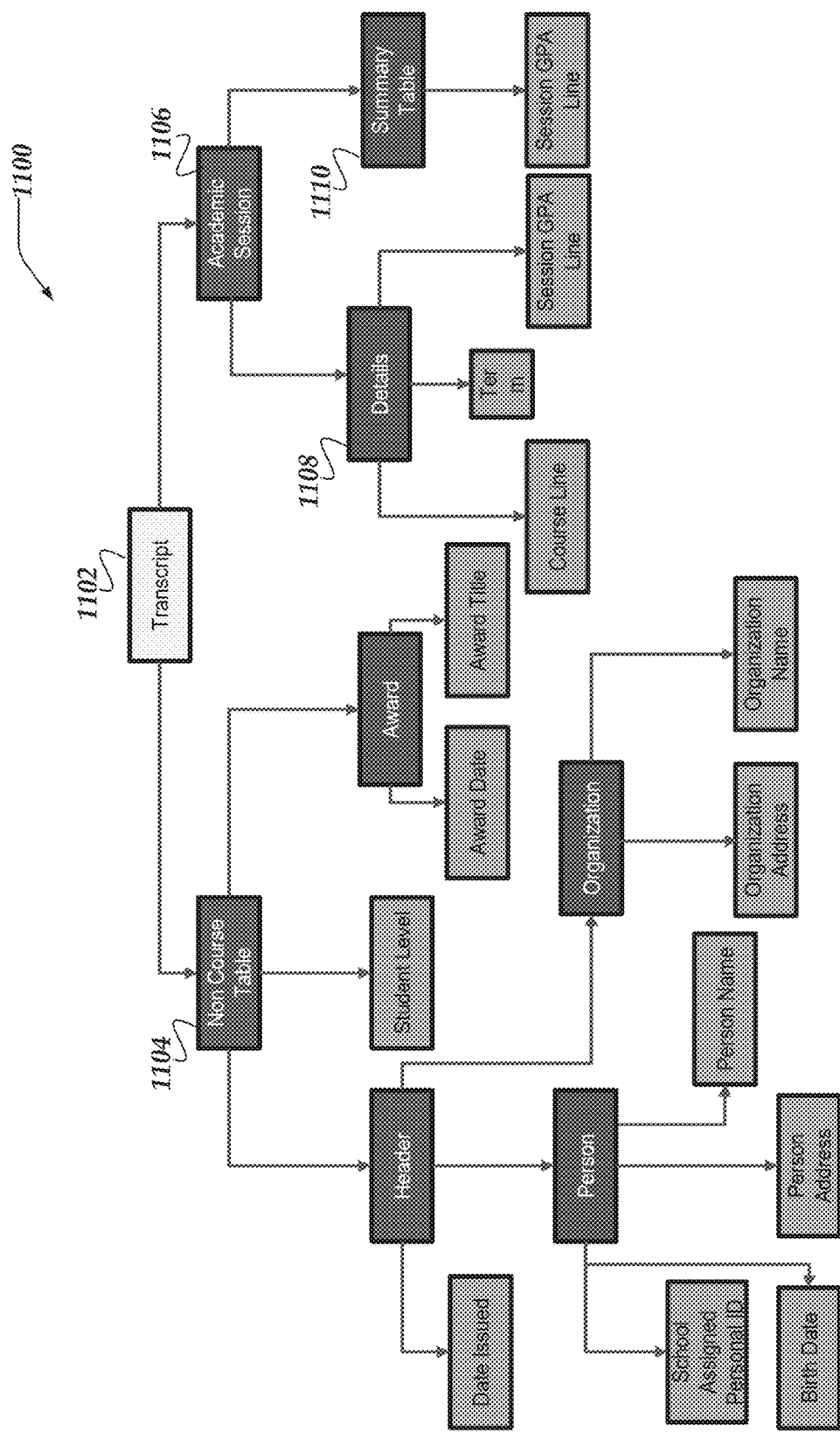
FIG. 11 illustrates a logical schematic of a feature tree for document ingestion pipelines in accordance with one or more of the various embodiments.

FIG. 11 illustrates a logical schematic of feature tree 1100 for document ingestion pipelines in accordance with one or more of the various embodiments. In some embodiments, ingestion engines may be arranged to employ one or more feature trees to improve recognition or classification of content shapes.

In some embodiments, feature trees, such as feature tree 1100 may include feature nodes, such as feature node 1102, feature node 1104, feature node 1106, feature node 1108, feature node 1110, or the like. In some embodiments, feature nodes represent types of content shapes that may be expected to be included in particular document types. In this example, feature node 1102 represents a root feature node that declares a document type. Accordingly, in some embodiments, the one or more other feature nodes may represent content shape types that may be expected to be included in the document type represented by the root feature node.

In some embodiments, root feature nodes may be considered to represent classified content shapes that correspond to the overall document type. In some embodiments, feature nodes, including root feature nodes may be associated with corresponding shape classifiers or shape classifier rules that ingestion engines may employ to classify content shapes.

In some embodiments, ingestion engines may be arranged to employ feature nodes to in part validate if content shapes may be classified correctly. Accordingly, in some embodiments, the more content shapes in a document that may be determined to be consistent with an associated feature tree, the more likely the classification of content shapes may be considered correct. In some embodiments, if a document has content shapes that may be inconsistent with its feature tree, the classification confidence score associated with the document or the mismatched classified content shapes may be reduced. Accordingly, in some embodiments, various feature nodes in a feature tree may be associated with confidence scores that may be added together to provide an overall confidence score based on the feature tree. In some cases, for some embodiments, confidence scores associated with feature tree matching may be employed along with classified content shape confidence scores to evaluate the quality of the interpretation of documents. In some cases, for some embodiments ingestion engines may be configured to track confidence scores associated with classified content shapes separately from confidence score associated with feature matching. Also, in some embodiments, ingestion engines may be arranged to generate a combined confidence score that may be based on the classified content shapes confidence score and the feature matching confidence scores.

In this example, for some embodiments, root feature node 1102 indicates that feature tree 1100 may be directed to transcript documents from educational or training organizations. Accordingly, in this example, transcripts may be expected to include one or more tables or one or more lists of information. Here, in this example, feature node 1104 represents that transcript documents may be expected to have tables or lists of information unrelated to course work, including personally identifiable information (e.g., name, address, telephone number, institution name, or the like. Likewise, in this example, feature node 1106 represents that transcript document may be expected to have one or more content shapes that include academic session information, such as, feature node 1108 which represents content shapes that include academic details such as lists of courses taken, performance metrics (e.g., grades, credits, attendance, or the like), or the like. Also, in this example, feature node 1110 represents that transcript documents may be expected to include content shapes that include summary information, such as, grade point averages, class ranking, or the like.

In some embodiments, ingestion engines may be arranged to compare how the classified content shapes for a document match with the feature tree for that document type. Accordingly, in some embodiments, ingestion engines may be arranged to employ the comparisons to evaluate if documents as a whole have been classified correctly, as well as, evaluating if the associated content shapes have been classified correctly.

Further, in some embodiments, a single document may be determined to have content shapes that may be included in more than one feature tree. In some cases, such documents may be determined to be hybrid documents. In some embodiments, if unexpected types of content shapes may be discovered in documents, ingestion engines may be configured to require higher classification confidence scores associated with the mismatched content shapes since the content shapes may be unexpected.

Also, in some embodiments, if the classified content shapes in a document do not match one or more known feature trees, the document may be considered a new type of document. Thus, in some embodiments, if the content shape classification confidence scores exceed a threshold value, the content shapes types included in the unmatched documents may be employed to automatically generate a new feature tree for a new document type.

In some embodiments, ingestion engines may be arranged to evolve or adapt features as more documents may be processed. Accordingly, in some embodiments, if standards or conventions shift with respect to how particular document types may be presented or the type of content they may include may evolve, ingestion engines may be arranged to modify feature trees if the prevalence of unmatched classified content shapes for particular document types exceed a threshold value.

In some embodiments, in many cases, ingestion engines may be arranged to employ a feature tree for different document types. In some embodiments, these feature trees may include feature nodes based on expected features for a given document type. Accordingly, in some embodiments, a feature tree for a particular document type may be employed across multiple institutions. For example, in some embodiments, one feature tree may be configured for resumes, one for transcripts, one for certifications, or the like.

In some embodiments, the development of feature trees for a specific document type may be an ongoing process, with ingestion engines configured to adapt or modify baseline feature trees as additional documents are processed. For example, when creating a feature tree for transcript documents from one educational organization, it may initially omit one or more content shape types that are later identified while developing feature trees for transcripts from other organizations. In such cases, the ingestion engines may be configured to update the feature tree for the original educational organization to include all relevant content shape types.

Figure 12:
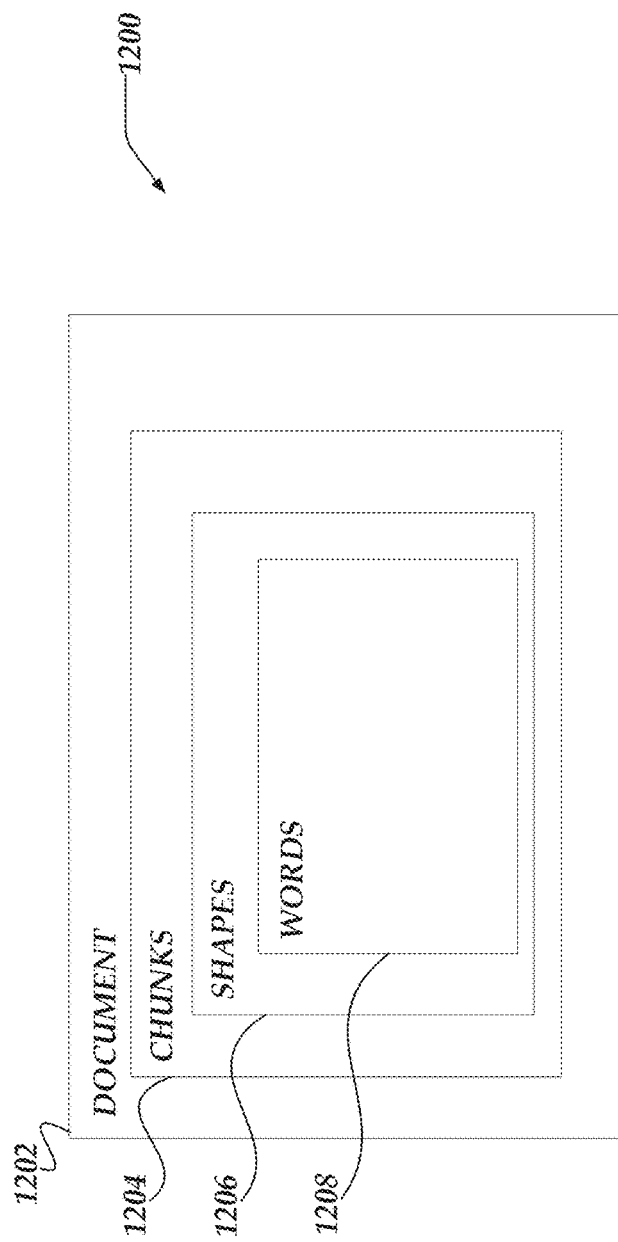
FIG. 12 illustrates a logical schematic for a document container for document ingestion pipelines in accordance with one or more of the various embodiments.

FIG. 12 illustrates a logical schematic for document container 1200 for document ingestion pipelines in accordance with one or more of the various embodiments. In some embodiments, document containers, such as, document container 1200 may be considered to be data structures for representing documents that have been ingested or documents that may be in the process of being ingested.

In some embodiments, document 1202 represents an envelop data structure that may include some or all information associated with an ingested document. In some cases, the raw document or original document may be referenced rather than being embedded in the document container. Accordingly, in some embodiments, document 1202 may include or reference one or more content chunks. In some embodiments, content chunks may represent one or more classified content shapes that may be merged into one or more classified content shape. For example, in some embodiments, classified content shapes that span document pages or columns may be grouped into single chunks.

In some embodiments, shapes 1206 may include or reference classified content shapes that were generated from an ingested raw/original document. In some embodiments, as indicated in the illustrations, classified content shapes that may be grouped into chunks may be considered to be within a parent chunk. In some embodiments, chunks may be comprised of related classified content shapes that together represent a larger collection of related terms. In some embodiments, chunks may be considered content shapes that include or may be associated with other content shapes. For example, a course result chunk may be employed to represent a table of course results that may include a header content shape and multiple course record content shapes that may span multiple pages.

Further, in some embodiments, words 1208 may represent the individual terms or short phrases that may be included in content shapes.

Also, in some embodiments, as mentioned above, document meta-data, geometric layout information, word counts, font-types, other styling information, or the like, may be captured or preserved during ingestion. Accordingly, in some embodiments, ingestion engines may be arranged to store the additional information in document containers either in a meta-data section or along side the data structures (e.g., document, chunk, shapes, words, or the like) that may be associated with the additional information.

Generalized Operations

FIGS. 13-19 represent generalized operations for document ingestion pipelines in accordance with one or more of the various embodiments. In one or more of the various embodiments, processes 1300, 1400, 1500, 1600, 1700, 1800, and 1900 described in conjunction with FIGS. 1-12 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers or containerized instances, such as, those in a cloud-based environment. However, embodiments are not so limited and various combinations of network computers, client computers, or the like may be utilized. Further, in one or more of the various embodiments, the processes described in conjunction with FIGS. 13-19 may perform actions for skill extraction pipelines in accordance with at least one of the various embodiments or architectures such as those described in conjunction with FIGS. 1-12. Further, in one or more of the various embodiments, some or all of the actions performed by processes 1300, 1400, 1500, 1600, 1700, 1800, and 1900 may be executed in part by ingestion engine 322, or the like.

Figure 13:
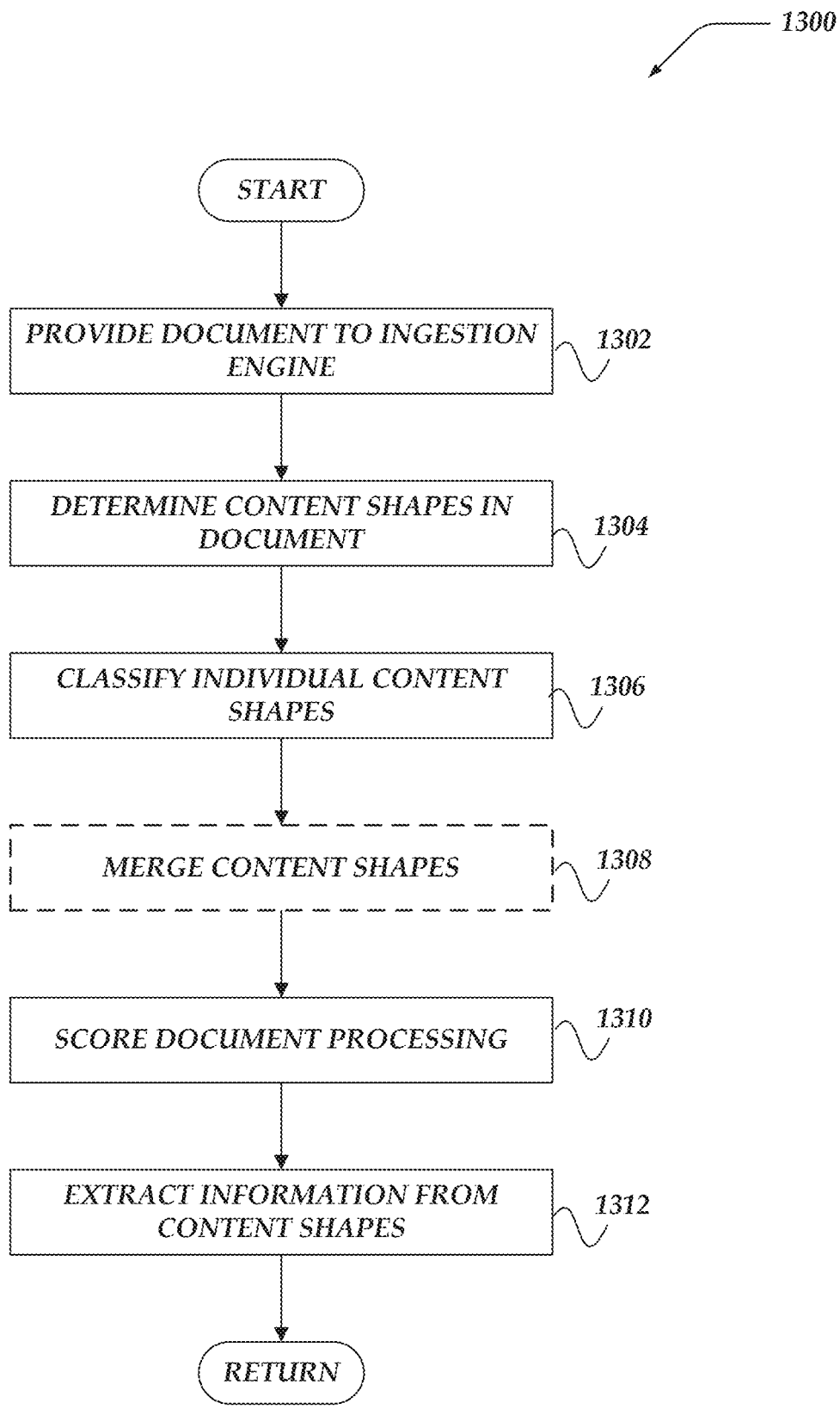
FIG. 13 illustrates an overview flowchart of a process for document ingestion pipelines in accordance with one or more of the various embodiments.

FIG. 13 illustrates an overview flowchart of process 1300 for document ingestion pipelines in accordance with one or more of the various embodiments. After a start block, at block 1302, in one or more of the various embodiments, a document may be provided to ingestion engines. As described, documents may be provided from various sources. In some cases, for some embodiments, ingestion engines may be arranged to automatically collect documents from one or more configured sources. In some embodiments, ingestion engines may be integrated with document management systems, file systems, databases, or the like, such that documents may be automatically collected. Also, in some embodiments, ingestion engines may be arranged to provide user interfaces that enable users or administrators to upload documents or otherwise select which documents to ingest.

In some embodiments, documents may be subject to one or more upstream pre-processing operations, such as optical character recognition, or the like. Accordingly, in some embodiments, documents provided to ingestion engines may be considered to be in a machine-readable format, such as, text, HTML, XML, OpenDocument Format (ODF), Open XML, other office application formats, or the like. Further, in some embodiments, ingestion engines may be arranged to be adaptable to other document formats (e.g., custom formats) by enabling additional parsers, format libraries, or the like, to provided by configuration information to account for local requirements or local circumstances.

At block 1304, in one or more of the various embodiments, ingestion engines may be arranged to determine one or more content shapes in the document. In some embodiments, ingestion engines may be arranged to evaluate the arrangement of words or terms within the document to determine one or more content shapes included in the document. In some embodiments, content shapes may be portions of the document that include content that may be directed to particular subject matter or content type within the document. For example, a portion of the document that includes author information may be considered a content shape.

In some embodiments, ingestion engines may be arranged to generate a layout graph based on the terms in the documents. Initially, each term in the document may be associated with a layout graph node such each term node may be associated with its nearest neighbors in horizontal directions and its nearest neighbors in the vertical directions.

Accordingly, in some embodiments, ingestion engines may be arranged to evaluate layout graphs or the included terms to determine content shapes. In some embodiments, content shapes may be considered to be partitions determined based on pruning the edges in the layout based on various considerations or conditions.

At block 1306, in one or more of the various embodiments, ingestion engines may be arranged to classify the one or more content shapes. In some embodiments, if content shapes may be determined, ingestion engines may be arranged to employ one or more shape classifiers to classify the content shapes into various content shape types. In some embodiments, content shapes that may be classified may be referred to classified content shapes.

In some embodiments, shape classifiers may employ various rules, machine-learning models, NLP, or the like, to predict the content shape types for content shapes. In some embodiments, shape classifiers may be configured to associate a confidence score with classified content shapes that represent the quality of the prediction.

At block 1308, in one or more of the various embodiments, optionally, ingestion engines may be arranged to merge one or more content shapes in one or more chunks. In some embodiments, page breaks, columns, intervening illustrations, or other document artifacts may intervene or interrupt a content shape. For example, in some embodiments, if a document includes a related list of information that spans two pages, the ingestion engines may initially determine two or more content shapes where there should be one because of the intervening page break. Likewise, in some embodiments, other related content shapes, such as header content shapes or record content shapes may be represented as a chunk to represent a table, or the like. Accordingly, in some embodiments, ingestion engines may be arranged to evaluate classified content shapes to determine if two or more of them should be merged into a chunk. Note, in some case, chunks may be considered to be content shapes that may be associated with other content shapes or content shapes that embed or include other related context shapes, such as tables, lists, or the like.

Accordingly, in some embodiments, ingestion engines may be arranged to various heuristics, rules, or the like, determine if two or more classified content shapes should be merged together. For example, a resume document is unlikely to have two separate sections for employment history. Accordingly, in some embodiments, if ingestion engines determine two or more employment history content shapes separated by an intervening page break, ingestion engines may be configured to merge the two employment history content shapes into one content shape.

Note, this block is indicated as optional because, in some cases, the classified content shapes determined in the document may not require merging.

At block 1310, in one or more of the various embodiments, ingestion engines may be arranged to score the document processing. In some embodiments, ingestion engines may be arranged to associate confidence scores with the classification of content shapes. Also, in some embodiments, ingestion engines may be arranged to associate an overall confidence score for the entire document. In some embodiments, ingestion engines may be arranged to generate document confidence scores based in part on the individual classified content shapes confidence scores.

In some embodiments, ingestion engines may be arranged to compare the document or the classified content shapes with a feature tree that represents various features that may be generally in common with particular document types. Accordingly, in some embodiments, documents as a whole as well as individual classified content shapes may be evaluated with respect to how well they match the features in a feature tree. For example, a transcript document may be expected to include various content shapes that include information, such as a list of courses taken, a summarization of the student's academic progress (e.g., GPA, accumulated credits, or the like), student profile/identity information, institution information, or the like. Likewise, for example, a content shape that include a list of courses taken may include one or more subordinate content shapes that hold information such as, course names, course grades, course status, session information (e.g., Fall Semester 2019), or the like. Accordingly, in some embodiments, individual classified content shapes may be scored based on how well they match up with the relevant feature tree.

At block 1312, in one or more of the various embodiments, ingestion engines may be arranged to enable the predictive learner platform, or the like, to extract information from the document based on the content shapes. In some embodiments, ingestion engines may be arranged to generate data structures that represent documents (See, FIG. 12). Accordingly, in some embodiments, ingestion engines may be arranged to store some or all of these data structures in databases or indexes that may be accessible to other applications, such as predictive learner platforms, or the like. In some embodiments, predictive learner platforms or other applications may provide user interfaces that enable users to submit queries, request reports, or the like. Also, in some embodiments, the stored document information may be provided to other data processing services for various data analysis.

Next, in one or more of the various embodiments, control may be returned to a calling process.

Figure 14:
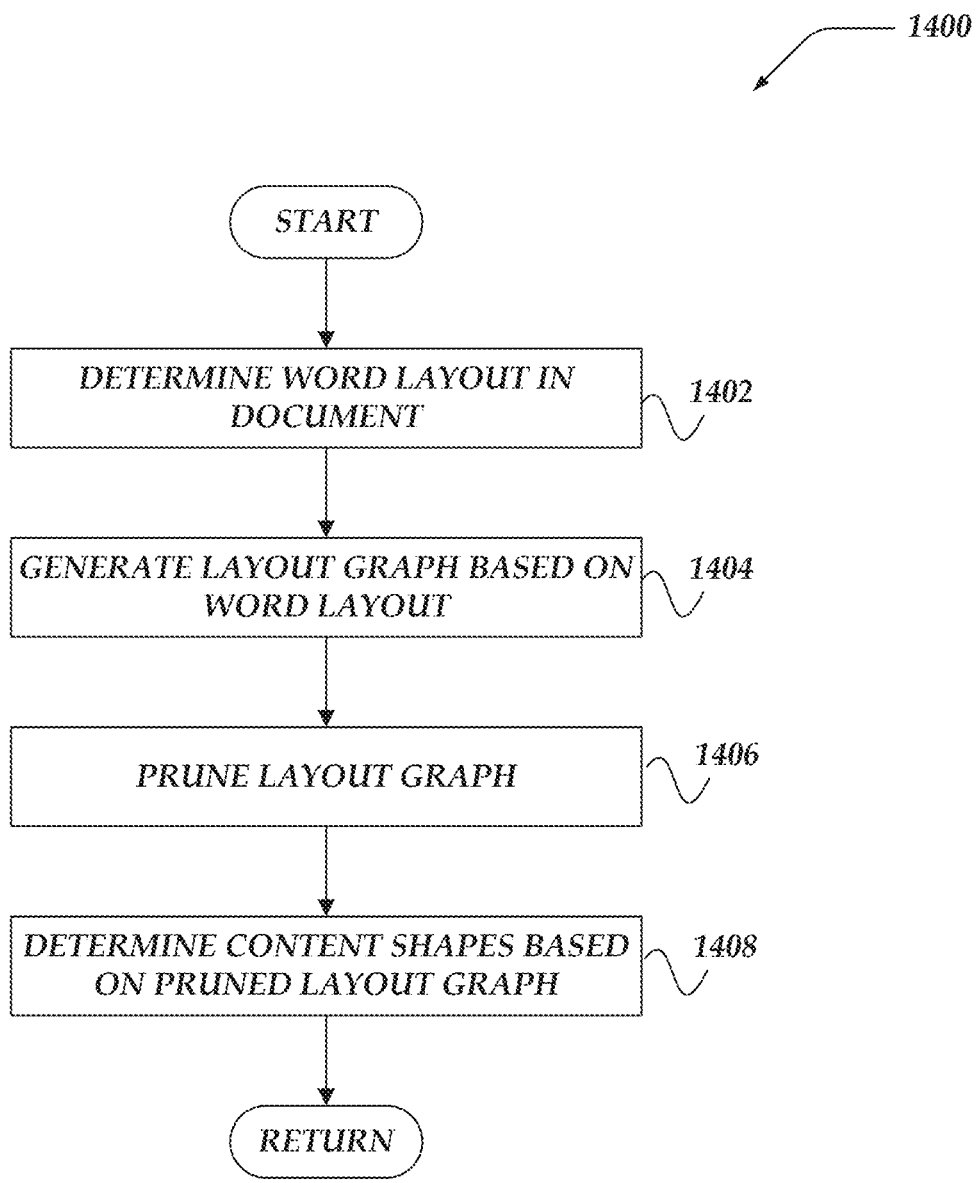
FIG. 14 illustrates a flowchart of a process for document ingestion pipelines in accordance with one or more of the various embodiments.

FIG. 14 illustrates a flowchart of process 1400 for document ingestion pipelines in accordance with one or more of the various embodiments. After a start block, at block 1402, in one or more of the various embodiments, ingestion engines may be arranged to determine the words or terms included in a document. In some embodiments, ingestion engines may be arranged to automatically scan document contents to identify the terms that may be included in the document. Note, in this context, words may include words, terms, numbers, short-phrases, abbreviations, or the like, that may be included documents. However, for brevity and clarity unless expressly stated otherwise, the terms "word," or "term" may be used interchangeably to refers to words, terms, numbers, short-phrases, abbreviations, or the like, that may be included in documents.

In some embodiments, ingestion engines may be arranged to determine additional metrics or attributes that may be associated with the determined terms, such as geometric positioning within the document, styling information, or the like, rather than simple generating a collection of terms independent from the document or the document layout.

At block 1404, in one or more of the various embodiments, ingestion engines may be arranged to generate a layout graph based on the words or terms included in the document. In some embodiments, layout graphs may include each term as term nodes and relationships between terms as edges in the layout graph.

In some embodiments, ingestion engines may be arranged to initially associated each term in the document with one or more edges that associate the terms with one or more other terms in the document.

In some embodiments, ingestion engines may be arranged to include edges that link terms with their neighbors in the horizontal direction and other edges that edge with their neighbors in the vertical direction.

In some embodiments, layout graphs may be directed graphs that follow the conventional reading order of the language used in the document. For example, in some embodiments, terms in documents or document portions using the English language may be linked using edges that may be directed from the left-to-right while terms in Arabic or Hebrew documents may be linked using edges that may be directed from the right-to-left. Accordingly, in some embodiments, ingestion engines may be arranged to select the direction of layout graph based on the underlying languages used in the document.

At block 1406, in one or more of the various embodiments, ingestion engines may be arranged to prune the layout graph. In some embodiments, if an initial layout graph may be generated, ingestion engines may be arranged to traverse the layout graph to determine one or more weak edges that may be pruned from the layout graph. In some embodiments, ingestion engines may be arranged to employ various metrics for evaluating if relationships between terms in the document merit an edge.

In some embodiments, ingestion engines may be arranged to evaluate the geometric distances between terms in the document. Accordingly, in some embodiments, terms that may be close to each other may be considered to have stronger relationships than terms that may be located farther away. In some embodiments, the particular threshold values for determining if terms may be close to each may be determined based on relative distances or absolute distances between terms in the document. Also, in some embodiments, ingestion engines may be arranged to employ other metrics or features such as styling. For example, if the ingestion engine discovers a font change, color change, bounding borders (e.g., a paragraph or table with a border), or the like to determine if edges in the layout graph should be pruned. Likewise, in some embodiments, page break, column breaks, or the like, may be used to determine which edges to prune for the layout graph.

Also, in some embodiments, ingestion engines may be arranged to identify other relationship weakening boundaries that may be determined in structured document formats. For example, if the document is an HTML document, structure artifacts such as paragraphs (e.g., p tags), divisions (e.g., div tags), spans, explicit line breaks, or the like, may be employed to evaluate edges. For example, if two neighboring terms may be in different paragraphs, in some cases it may indicate that the relationship between the terms may be weak. In some embodiments, an evaluation of two or more metrics or two or more features may be used to evaluate the strength of relationships between terms. For example, a relationship that spans two paragraphs that are associated with the same style tags or other identifiers may be considered stronger than other relationships that span two paragraphs that have different styles.

In some embodiments, ingestion engines may be arranged to employ heuristics that evaluate one or more features to determine a strength of relationships.

In some embodiments, ingestion engines may be arranged to be adaptable to various document features, meta-data, or the like. In some cases, pruning rules or heuristics may be determined based on experimentation. Accordingly, in some embodiments, ingestion engines may be arranged to determine the particular heuristics, metrics, conditions, threshold values, or the like, from configuration information to account local requirements or local circumstances.

Note, in some embodiments, ingestion engines may be arranged to "remove" pruned edges by associating them with a weak strength score rather than completely deleting the edge from the layout graph. Accordingly, in some embodiments, the relationship may remain available in the layout graph for subsequent analysis that may or may not be related to determining content shapes.

At block 1408, in one or more of the various embodiments, ingestion engines may be arranged to determine one or more content shapes based on the pruned layout graph.

In some embodiments, ingestion engines may be arranged to determine content shapes based on clustering layout nodes in the layout graph based in part on the strength of the relationships between term nodes. For example, weak edges or pruned edges may inherently provide clusters of term nodes. Thus, in some embodiments, ingestion engines may be arranged to identify likely partitions in layout graphs that may be predicted to be content shapes.

Also, in some embodiments, additional content neutral features may be evaluated to determine content shapes, such as structural patterns/features in the document, such as lists, tables, or the like. In some cases, if the document format supports meta-data that may correspond to structural features (e.g., lists, tables, paragraphs), ingestion engines may be enabled to employ those features for identifying content shapes. Thus, in some embodiments, ingestion engines may be arranged to employ different heuristics or rules depending on the document format.

Next, in one or more of the various embodiments, control may be returned to a calling process.

Figure 15:
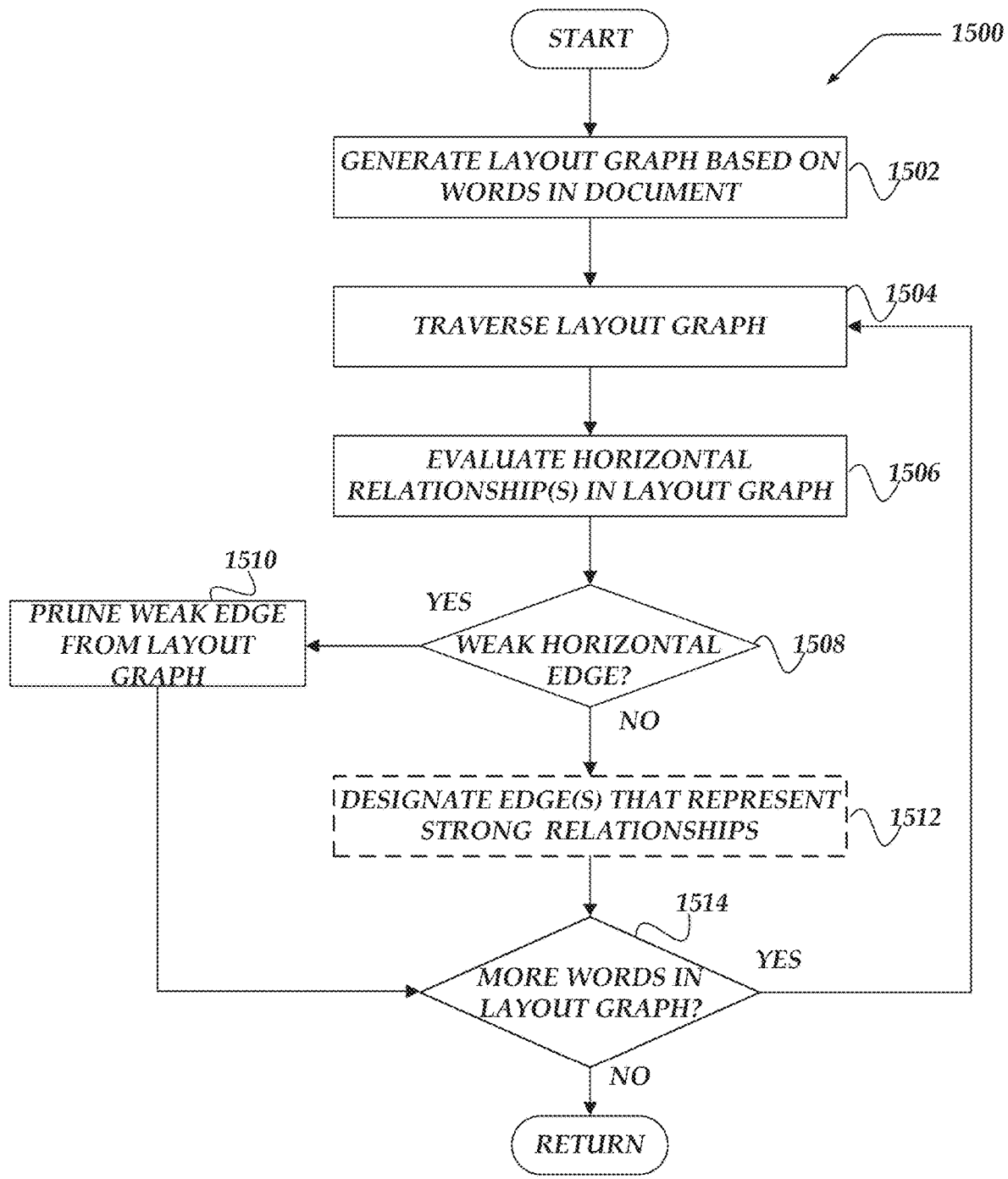
FIG. 15 illustrates a flowchart of a process for document ingestion pipelines in accordance with one or more of the various embodiments.

FIG. 15 illustrates a flowchart of process 1500 for document ingestion pipelines in accordance with one or more of the various embodiments. After a start block, at block 1502, in one or more of the various embodiments, ingestion engines may be arranged to generate a layout graph based on the words in a document. In some embodiments, ingestion engines may be arranged to scan through the contents of the document to identify the terms in the document to initialized a layout graph. In some embodiments, ingestion engines may be arranged to generate term nodes based on the terms determined in the document. In some embodiments, initializing the layout graph may include automatically generating edges in the horizontal direction or the vertical directions to link term nodes with their nearest neighbor in the given directions. As described above, in some embodiments, layout graphs may be considered directed graphs such that the direction of the edges linking term nodes follows the reading direction associated with the language used in the document.

At block 1504, in one or more of the various embodiments, ingestion engines may be arranged to traverse the nodes in the layout graph. In one or more of the various embodiments, ingestion engines may be arranged to start at the first term nodes according to the reading order associated with the document. For example, if the document is in the English language, the traversal may begin at the term node in the top left corner of the document. In some embodiments, ingestion engines may be arranged to concurrently traverse layout graphs from more than one start point. For example, in some embodiments, ingestion engines may be arranged to concurrently traverse each portion of the layout graph that may correspond to separate pages of the document.

Also, in some embodiments, ingestion engines may be arranged to collect various metrics during the traversals, such as geometric distance between terms, style changes/consistency, or the like, that may be associated with edges between the term nodes.

At block 1506, in one or more of the various embodiments, ingestion engines may be arranged to evaluate one or more horizontal relationships in the layout graph. In some embodiments, ingestion engines may be arranged to determine one or more metrics or one or more features associated with the term nodes or the relationships between term nodes. In some embodiments, term nodes in the layout graph may be initially linked to their nearest horizontal neighbors by edges in the layout graph. Accordingly, ingestion engines may be arranged to evaluate the strength of the relationships between term nodes linked by horizontal edges to determine if the edges may be weak edges that may be pruned from the layout graph.

In some embodiments, ingestion engines may be arranged to employ various heuristics, rules, or conditions to evaluate the strength of the horizontal relationships. As mentioned above, geometric distance between terms in the document may be employed to evaluate in part the strength of the relationships between nodes. Also, in some embodiments, natural language features such as parts of speech, punctuation, subject-noun agreement, or the like, may be considered to evaluate the strength of relationships. For example, a relationship between two terms in the same sentence may be considered stronger than a relationship between a final term in sentence and a first term in the next sentence.

In some embodiments, ingestion engines may be arranged to apply a suite of one or more tests or heuristics to evaluate the strength of horizontal relationships between neighboring term nodes. In some embodiments, ingestion engines may be arranged to iterate through the suite of tests or heuristics to evaluate the strength of horizontal relationships. In some embodiments, ingestion engines may be arranged to import instructions or rules for one or more of the tests or heuristics used for evaluating horizontal relationships from configuration information. Accordingly, in some embodiments, ingestion engines may be adaptable to newly encountered document formats or document types. In some embodiments, ingestion engines may be arranged to employ more than one tests or heuristics such that the results of the tests or heuristics may be compared with one another. Accordingly, in some embodiments, the performance of new or candidate tests or heuristics may be compared with existing tests or heuristics. Thus, in some embodiments, ingestion engines may be arranged to track the performance or performance comparisons to identify if candidate tests or heuristics may have improved performance than others that may be being used in production.

In some embodiments, ingestion engines may be arranged to assign a strength of relationship to the horizontal edges that link term nodes in the layout graph. For example, in some embodiments, ingestion engines may assign a strength value of 1 through 100 or 0.0 through 1.0 to indicate the strength of a relationship between term nodes.

At decision block 1508, in one or more of the various embodiments, if a weak horizontal edge may be determined, control may flow to block 1510; otherwise, control may flow to block 1512.

In some embodiments, ingestion engines may be configured with a threshold value for determining if a horizontal relationship and its associated edge may be weak or strong. The threshold value may be assigned differently depending on the type of documents, subject matter, source of document, format of document, or the like. For example, in some cases, determining strength of relationships for a structured document like HTML documents may have higher threshold value than unstructured documents that may omit meta-data, markup tags, or the like, that may indicate relationships between or among terms in the document.

At block 1510, in one or more of the various embodiments, ingestion engines may be arranged to prune the weak edge from the layout graph. In some embodiments, edges corresponding to weak horizontal relationships may be pruned from the layout graph. Note, in some embodiments, ingestion engines may be arranged to mark the edges as pruned rather than deleting them completely from the layout graph. In some cases, for some embodiments, the assignment of weak (low) strength of relationship values to edges may be employed to indicate that those edges may be considered to be pruned from layout graphs.

At block 1512, in one or more of the various embodiments, optionally, ingestion engines may be arranged to indicate the edges that represent strong relationships associated with the visited term nodes. In some embodiments, ingestion engines may be arranged to tag or flag edges to indicate the strong relationships. Also, in some embodiments, ingestion engines may be arranged to associate the strength of relationship value with the edges associated with strong relationships rather than introducing static/opaque indicators. Accordingly, in some embodiments, the relationships in a layout graph may be evaluated using different threshold values based on the strength of relationship values rather than having to reset flags or tags that may indicate strong relationships.

Note, this block is indicated as being optional because in some embodiments the edges that remain in the layout graph after pruning may be considered to represent strong relationships even without tags or otherwise specific designators.

At decision block 1514, in one or more of the various embodiments, if there may be more term nodes in the layout graph, control may loop back to block 1504 to continue the traversal; otherwise, control may be returned to a calling process.

Note, as described above, ingestion engines may be arranged to execute two or more processes to concurrently evaluate the strength of horizontal relationships between or among term nodes in the layout graph.

Figure 16:
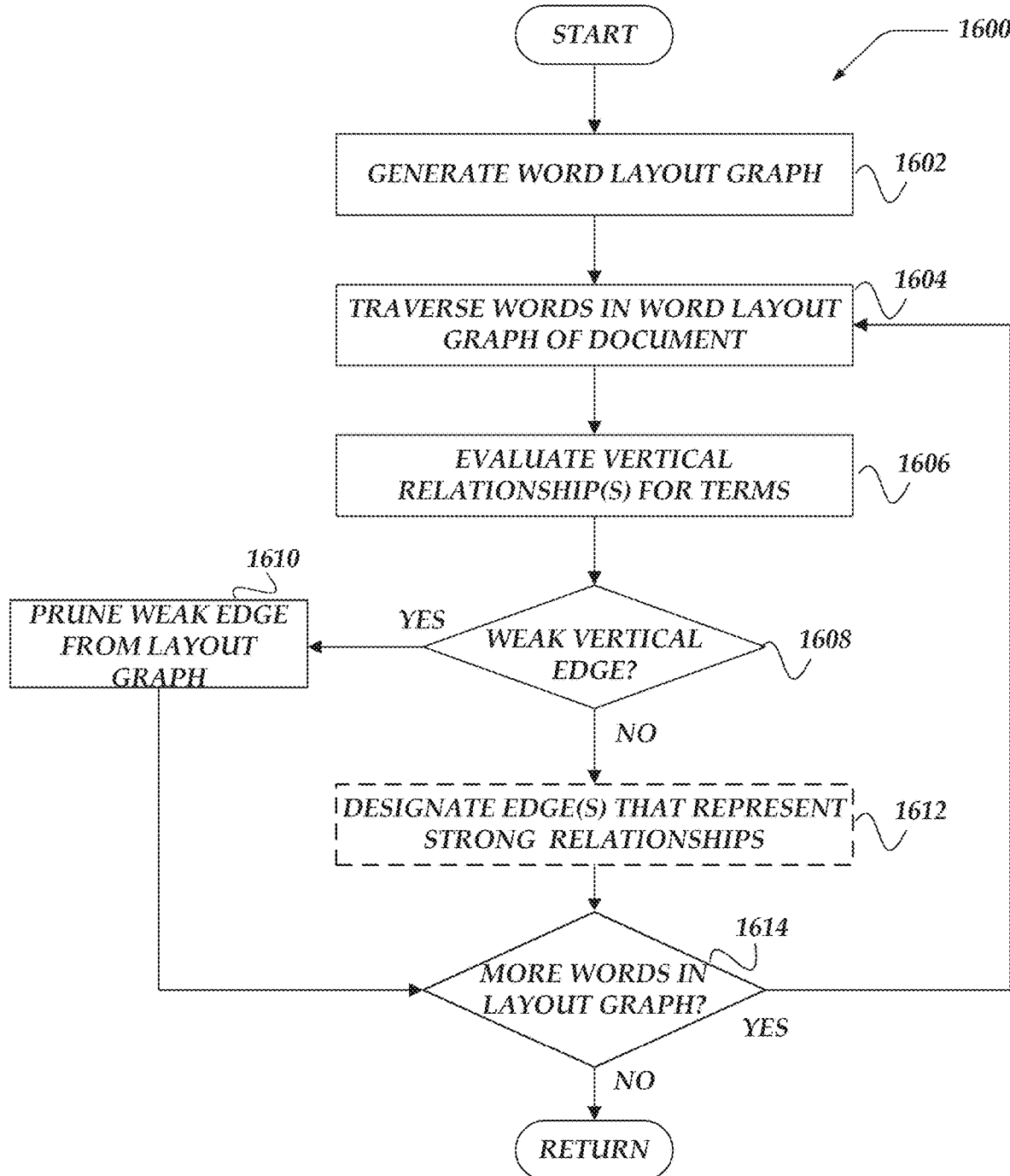
FIG. 16 illustrates a flowchart of a process for document ingestion pipelines in accordance with one or more of the various embodiments.

FIG. 16 illustrates a flowchart of process 1600 for document ingestion pipelines in accordance with one or more of the various embodiments. After a start block, at block 1602, in one or more of the various embodiments, ingestion engines may be arranged to generate a layout graph based on the words in a document. In some embodiments, ingestion engines may be arranged to scan through the contents of the document to identify the terms in the document to initialize a layout graph. In some embodiments, ingestion engines may be arranged to generate term nodes based on the terms determined in the document. In some embodiments, initializing the layout graph may include automatically generating edges in the horizontal direction or the vertical directions to link term nodes with their nearest neighbor in the given directions. As described above, in some embodiments, layout graphs may be considered directed graphs such that the direction of the edges linking term nodes follows the reading direction associated with the language used in the document.

At block 1604, in one or more of the various embodiments, ingestion engines may be arranged to traverse the nodes in the layout graph. In one or more of the various embodiments, ingestion engines may be arranged to start at the first term nodes according to the reading order associated with the document. For example, if the document is in the English language, the traversal may begin at the term node in the top left corner of the document. In some embodiments, ingestion engines may be arranged to concurrently traverse layout graphs from more than one start point. For example, in some embodiments, ingestion engines may be arranged to concurrently traverse each portion of the layout graph that may correspond to separate pages of the document.

Also, in some embodiments, ingestion engines may be arranged to collect various metrics during the traversals, such as geometric distance between terms, style changes/consistency, or the like, that may be associated with edges between the term nodes.

At block 1606, in one or more of the various embodiments, ingestion engines may be arranged to evaluate one or more vertical relationships in the layout graph. In some embodiments, ingestion engines may be arranged to determine one or more metrics or one or more features associated with the term nodes or the relationships between term nodes. In some embodiments, term nodes in the layout graph may be initially linked to their nearest vertical neighbors by edges in the layout graph. Accordingly, ingestion engines may be arranged to evaluate the strength of the relationships between term nodes linked by vertical edges to determine if the edges may be weak edges that may be pruned from the layout graph.

In some embodiments, ingestion engines may be arranged to employ various heuristics, rules, or conditions to evaluate the strength of the vertical relationships. As mentioned above, geometric vertical distance between vertically linked terms in the document may be employed to evaluate in part the strength of the relationships between nodes. Also, in some embodiments, natural language features such as parts of speech, punctuation, subject-noun agreement, or the like, may be considered to evaluate the strength of relationships. For example, a vertical relationship between two terms in different paragraphs may be considered weaker than vertical relationships between terms in the same paragraph.

In some embodiments, ingestion engines may be arranged to apply a suite of one or more tests or heuristics to evaluate the strength of vertical relationships between neighboring term nodes. In some embodiments, ingestion engines may be arranged to iterate through the suite of tests or heuristics to evaluate the strength of vertical relationships. In some embodiments, ingestion engines may be arranged to import instructions or rules for one or more of the tests or heuristics used for evaluating vertical relationships from configuration information. Accordingly, in some embodiments, ingestion engines may be adaptable to newly encountered document formats or document types. In some embodiments, ingestion engines may be arranged to employ more than one tests or heuristics such that the results of the tests or heuristics may be compared with one another. Accordingly, in some embodiments, the performance of new or candidate tests or heuristics may be compared with existing tests or heuristics. Thus, in some embodiments, ingestion engines may be arranged to track the performance or performance comparisons to identify if candidate tests or heuristics may have improved performance than others that may being used in production.

In some embodiments, ingestion engines may be arranged to assign a strength of relationship to the horizontal edges that link term nodes in the layout graph. For example, in some embodiments, ingestion engines may assign a strength value of 1 through 100 or 0.0 through 1.0 to indicate the strength of a relationship between term nodes.

At decision block 1608, in one or more of the various embodiments, if a weak vertical edge may be determined, control may flow to block 1610; otherwise, control may flow to block 1612.

In some embodiments, ingestion engines may be configured with a threshold value for determining if a vertical relationship between term nodes may be weak or strong. The threshold value may be assigned differently depending on the type of documents, subject matter, source of document, format of document, or the like. For example, in some cases, determining strength of relationships for a structured document like HTML documents may have higher threshold value than unstructured documents that may omit meta-data, markup tags, or the like, that may indicate relationships between or among terms in the document.

At block 1610, in one or more of the various embodiments, ingestion engines may be arranged to prune the weak vertical edge from the layout graph. In some embodiments, edges corresponding to weak vertical relationships may be pruned from the layout graph. Note, in some embodiments, ingestion engines may be arranged to mark the edges as pruned rather than deleting them completely from the layout graph. In some cases, for some embodiments, the assignment of weak (low) strength of relationship values to edges may be employed to indicate that those edges may be considered to be pruned from layout graphs.

At block 1612, in one or more of the various embodiments, optionally, ingestion engines may be arranged to indicate the edges that represent strong relationships associated with the visited term nodes. In some embodiments, ingestion engines may be arranged to tag or flag edges to indicate the strong relationships. Also, in some embodiments, ingestion engines may be arranged to associate the strength of relationship values with the edges associated with strong relationships rather than introducing static/opaque indicators. Accordingly, in some embodiments, the relationships in a layout graph may be evaluated using different threshold values based on the strength of relationship values rather than having to reset flags or tags that may indicate strong relationships.

Note, this block is indicated as being optional because in some embodiments the edges that remain in the layout graph after pruning may be considered to represent strong relationships even without tags or otherwise specific designators.

At decision block 1614, in one or more of the various embodiments, if there may be more term nodes in the layout graph, control may loop back to block 1604 to continue the traversal; otherwise, control may be returned to a calling process.

Note, as described above, ingestion engines may be arranged to execute two or more processes to concurrently evaluate the strength of vertical relationships between or among term nodes in the layout graph.

Figure 17:
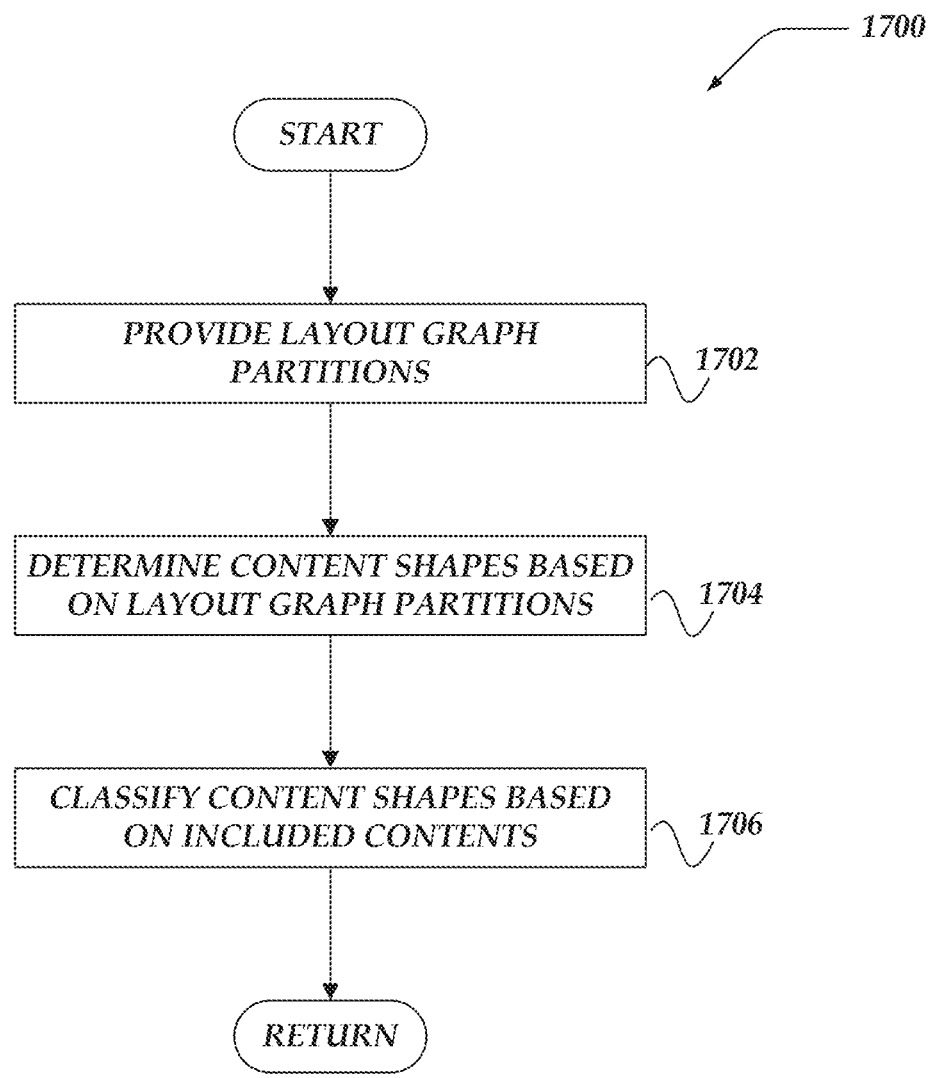
FIG. 17 illustrates a flowchart of a process for document ingestion pipelines in accordance with one or more of the various embodiments.

FIG. 17 illustrates a flowchart of process 1700 for document ingestion pipelines in accordance with one or more of the various embodiments. After a start block, at block 1702, in one or more of the various embodiments, ingestion engines may be arranged to provide one or more layout graph partitions. As described above, ingestion engines may be arranged to traverse the layout graph to identify weak relationships that may be pruned from the layout graph. Accordingly, in some embodiments, the pruning may produce one or more layout graph partitions that represent portions of the document that may be evaluated to determine if they may be content shapes.

At block 1704, in one or more of the various embodiments, ingestion engines may be arranged to determine one or more content shapes based on the one or more layout graph partitions.

In some embodiments, content shapes may be content neutral divisions or portions of the document. In some embodiments, ingestion engines may determine candidate content shapes based on their isolation from other candidate content shapes. In some embodiments, one or more content shapes may be embedded or nested within larger content shapes. Accordingly, in some embodiments, ingestion engines may be arranged to evaluate candidate content shapes by evaluating the internal structure of partitions to determine if there may be embedded content shapes. In some embodiments, in some cases, ingestion engines may be arranged to use meta-data that may be included documents that may use structured formats, such as HTML, XML, OpenDocument Format (ODF), or the like, to identify content shapes that include other content shapes as list items, table rows, or the like.

At block 1706, in one or more of the various embodiments, ingestion engines may be arranged to classify the one or more content shapes based on the contents of the content shapes. As described above, in some embodiments, ingestion engines may be arranged to employ a shape classifier to predict the content shape type for each content shape.

In some embodiments, shape classifiers may be considered part of ingestion engines or separate processes that may be employed by ingestion engines. In some embodiments, shape classifiers may include one or more collections of rules, heuristics, machine-learning classifiers, or the like, for predicting content shape types based on the terms included in the determined content shape. For brevity and clarity ingestion engines may be described as performing one or more actions that may be performed by its shape classifier.

In some embodiments, ingestion engines may include one or more rules, heuristics, machine-learning classifiers, generative AI prompts, or the like, that may be directed to particular types of documents. For example, ingestion engines may include particular classification tests for resume documents that may be different than classification tests for transcripts, job descriptions, or the like. Accordingly, in some embodiments, ingestion engines may be arranged to apply classification tests that may be associated with the type of document being processed.

In some embodiments, ingestion engines may be configured to employ one or more classification tests that may include integration with generative AIs. Accordingly, in some embodiments, content included in content shapes may be embedded into generative AI prompts that may be submitted to generative AI to predict if the content may be consistent with a particular content shape type.

In some embodiments, ingestion engines may be configured to expect particular content shape types for particular document types. Accordingly, in some embodiments, particular classification tests may be directed to particular document types because it may be expected that the particular document types include particular types of content. Also, in some embodiments, one or more classification tests may be applicable to more than one type of document. Further, in some embodiments, one or more classification tests may be organized in a hierarchy such that a prediction from one classification test may influence the selection of the next classification test.

For example, in some embodiments, content shapes that include a person's name may be predicted to be user profile content shape or author content shape depending on the type of document. However, in some embodiments, additional classification tests that test for telephone numbers, mailing addresses, or the like, may be execute to confirm or improve the confidence score of the prediction that the content shape is a user/author content shape.

Further, in some embodiments, ingestion engines may be arranged to classify content shapes based on one or more images or visualizations that may be included in a content shape.

In some embodiments, one or more classification tests may be arranged to assign a confidence score that represents a quality of the prediction. In some cases, two or more classification tests may contribute to an overall confidence score for the classification of the content shape.

In some embodiments, if a confidence score associated with a content shape exceeds a declared threshold value, ingestion engines may be arranged to indicate that the content shape may be a classified content shape.

In some embodiments, ingestion engines may be arranged to indicate (tag, flag, set-aside, or the like) the content shapes that may remain unclassified after execute the relevant classification tests. Accordingly, in some embodiments, ingestion engines may be arranged to generate reports or notifications regarding the content shape that remain unclassified. Accordingly, in some embodiments, ingestion engines may enable user or administrators to generate additional classification tests.

Further, in some embodiments, ingestion engines may be arranged to automatically compare features or characteristics of classified content shapes to identify one or more additional features or characteristics that may be in common with each other. Accordingly, in some embodiments, ingestion engines may be arranged to update classification tests to include the one or more additional features or characteristics. Thus, in some embodiments, ingestion engines may be arranged to automatically improve classification of content shapes as additional identifying features or characteristics may be discovered for particular content shape types.

In some embodiments, some or all of the classification tests may be employed for documents that have different layouts or format because the tests may be directed to classifying individual content shapes based on the content the individual content shapes. Accordingly, in some embodiments, ingestion engines may be enabled to classify content shapes for different document even though the content shapes may be positioned in the document, formatted, or the like, In some embodiments, ingestion engines may be arranged to store classified content shapes in data stores, databases, or the like, for subsequent analysis, such as content extraction, or the like.

Next, in one or more of the various embodiments, control may be returned to a calling process.

Figure 18:
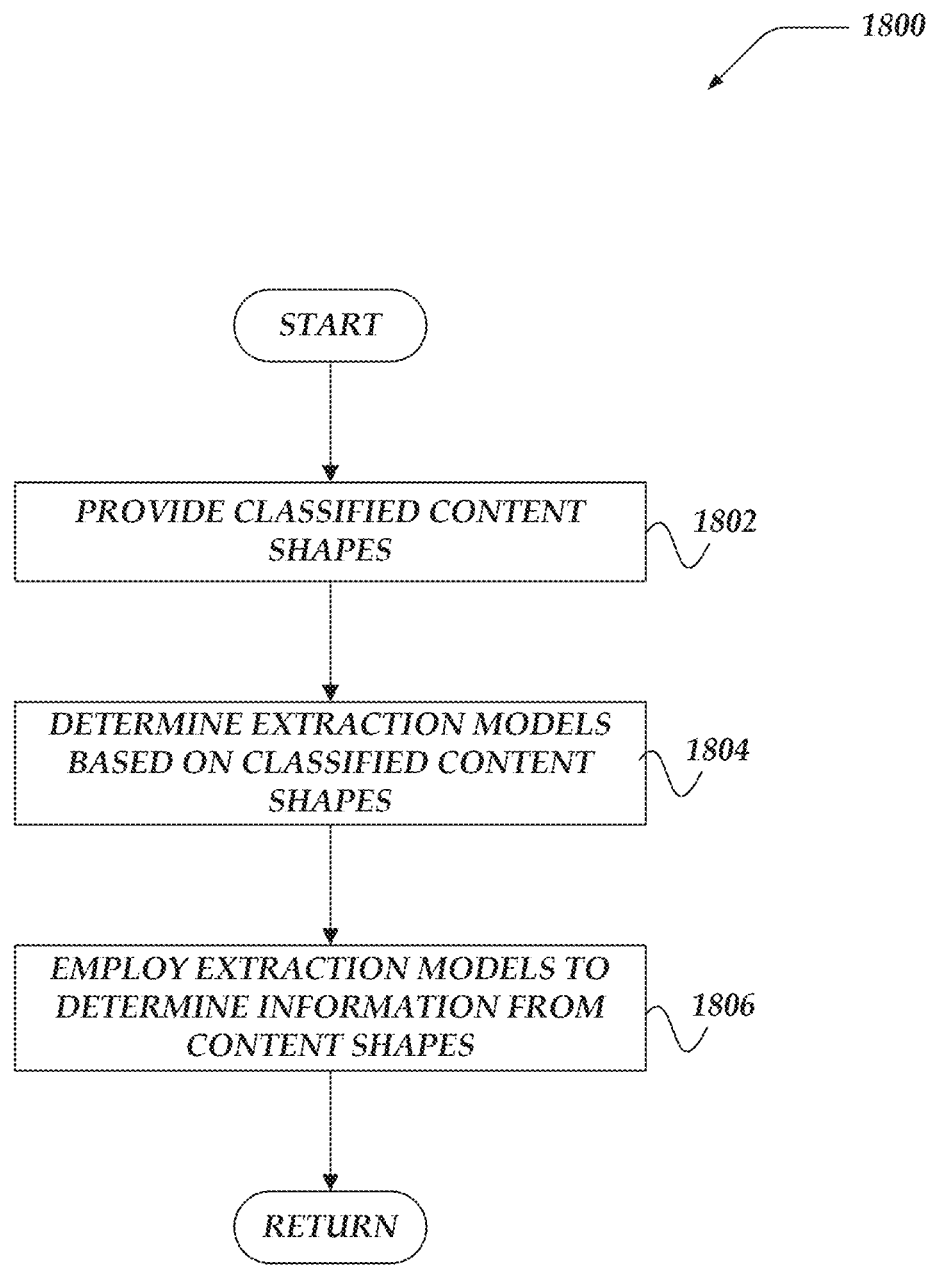
FIG. 18 illustrates a flowchart of a process for document ingestion pipelines in accordance with one or more of the various embodiments.

FIG. 18 illustrates a flowchart of process 1800 for document ingestion pipelines in accordance with one or more of the various embodiments. After a start block, at block 1802, in one or more of the various embodiments, ingestion engines may be arranged to provide one or more classified content shapes. As described above, ingestion engines may be arranged to classify content shapes based on the application of one or more classification tests.

In some embodiments, provided classified content shapes may be content shapes that may be associated with a classification confidence score that exceeds a threshold value. In some embodiments, ingestion engines may be arranged to enable different organizations to assign different confidence score threshold. Accordingly, in some embodiments, organizations that may accept less accurate predictions (classifications) may assign lower confidence score threshold values. Also, in some embodiments, organizations that may require more accurate predictions (classifications) may assign higher confidence scores.

Also, in some embodiments, ingestion engines may be arranged to enable different type of content shapes (different classifications) to be assigned different confidence score thresholds. Accordingly, in some embodiments, content shape types that may be expected to include critical information may be assigned higher scores. Or, in some embodiments, if there may be one or more content shape types that false positive classifications may be more disadvantageous than other content shape types, those critical content shape types may be assigned higher confidence score threshold values than others.

Accordingly, in some embodiments, the provided classified content shapes may be associated with confidence scores that exceed the relevant confidence score threshold for the organization, document type, or individual content shape types.

At block 1804, in one or more of the various embodiments, ingestion engines may be arranged to determine one or more extraction models based on the classified content shapes. In some embodiments, extraction models may be specialized for extraction data from particular content shape types. Accordingly, in some embodiments, ingestion engines may be arranged to select one or more extraction models to apply to particular classified content shapes. In some embodiments, extraction models may be data structures the encapsulate rules, instructions, or the like, for extracting information that may be expected to be included in particular classified content shapes.

For example, for some embodiments, if a content shape is classified as an employment history content shape, ingestion engines may be arranged to employ one or more extraction models that may be designated for extracting information, such as, employer, job description, dates of employment, or the like.

In some embodiments, ingestion engines may be configured to associate one or more extraction models to one or more particular content shape types. Accordingly, in some embodiments, ingestion engines may be arranged to select the particular extraction models based on the content shape type.

In some embodiments, some extraction models may be arranged to generate metrics or evaluate one or more characteristics of a content shape rather than extracting text or terms from the content shape. For example, in some embodiments, an extraction model may be arranged to count the number of items included in a list of courses in a transcript or a number of jobs in an employment history list.

At block 1806, in one or more of the various embodiments, ingestion engines may be arranged to employ the one or more extraction models to determine information from the classified content shapes.

In some embodiments, ingestion engines may be arranged to execute one or more relevant extraction models to extract particular content or information of interest.

In some embodiments, extraction models may include rules, heuristics, NLP instructions, regular expressions, or the like, for extracting information from classified content shapes. In some cases, for some embodiments, one or more extraction models may be associated with particular content shape types. Accordingly, in some embodiments, extraction models may be configured to extract particular terms or phrases from the content included in classified content shapes.

Further, in some embodiments, extraction models may include instructions for employing machine vision or multimodal large language models to evaluate screenshots or other images that may correspond to classified content shapes or associated chunks. Accordingly, in some embodiments, one or more features of the image of the classified content shape may be extracted into key value pairs, or the like, that may be used in subsequent data analysis.

In some cases, extraction models may include one or more specialized generative AI prompts that train generative AI to find particular information from within classified content shapes. For example, ingestion engines may generate prompts that include one or more features associated with the classified content shapes, including one or more terms, one or more style features, one or more layout features, or the like.

Accordingly, in some embodiments, extraction models may be specialized for particular content shape type based on an expectation of the type of information that is likely to be found in particular classified content shapes. Also, in some embodiments, extraction models may be arranged to search for structural patterns, such as, lists, list records, tables, or the like, that may be sometimes found in particular content shape types.

In some embodiments, ingestion engines may be arranged to execute one or more extraction models or extraction model actions to obtain information from the classified content shapes. In some embodiments, extraction models may be configured to find information that may be omitted or missing from classified content shapes. For example, for some embodiments, an extraction model may be configured to extract applicant mailing addresses from applicant profile content shapes in resume documents. However, for example, if the applicant profile content shape omits the applicants mailing address, the extraction model may continue extract other types of profile information from the classified content shape rather than rejecting or discarding the classified content shapes. Thus, in some embodiments, an extraction model directed to a particular content shape type may include instructions, rules, or the like, for extracting more terms than may actually be present in the classified content shape.

Also, in some embodiments, extraction models may be configured to designate one or more terms as critical terms, such that a failure to extract those terms from a classified content shapes may be considered an error. For example, in some embodiments, if the extraction model for a applicant profile content shape fails to extract a designated critical term such as the name of the applicant, ingestion engines may raise an error. Note, in some embodiments, errors associated with failures to extract critical terms from classified content shapes may be caused by the extraction models or the shape classifiers.

Also, in some embodiments, ingestion engines may be arranged to collect metrics regarding the performance extraction models. For example, in some embodiments, ingestion engines may be arranged to track how many of the expected terms may be extracted from classified content shapes. Also, in some embodiments, two or more extraction models may be arranged to independently extract terms from the same classified content shapes. Accordingly, in some embodiments, ingestion engines may be arranged to compare the results from the different extraction models. Accordingly, in some embodiments, metrics such as extracted term count may be compared. Also, in some embodiments, values for particular expected terms provided by the different extraction models may be compared to evaluate to performance of the current extraction models or evaluate candidate extraction models that may not be in production.

In some embodiments, ingestion engines may be arranged to be adaptable to processing new or different content shape types. Accordingly, in some embodiments, ingestion engines may be arranged to obtain some or all extraction models via configuration information to account for local requirements or local circumstances.

Next, in one or more of the various embodiments, control may be returned to a calling process.

Figure 19:
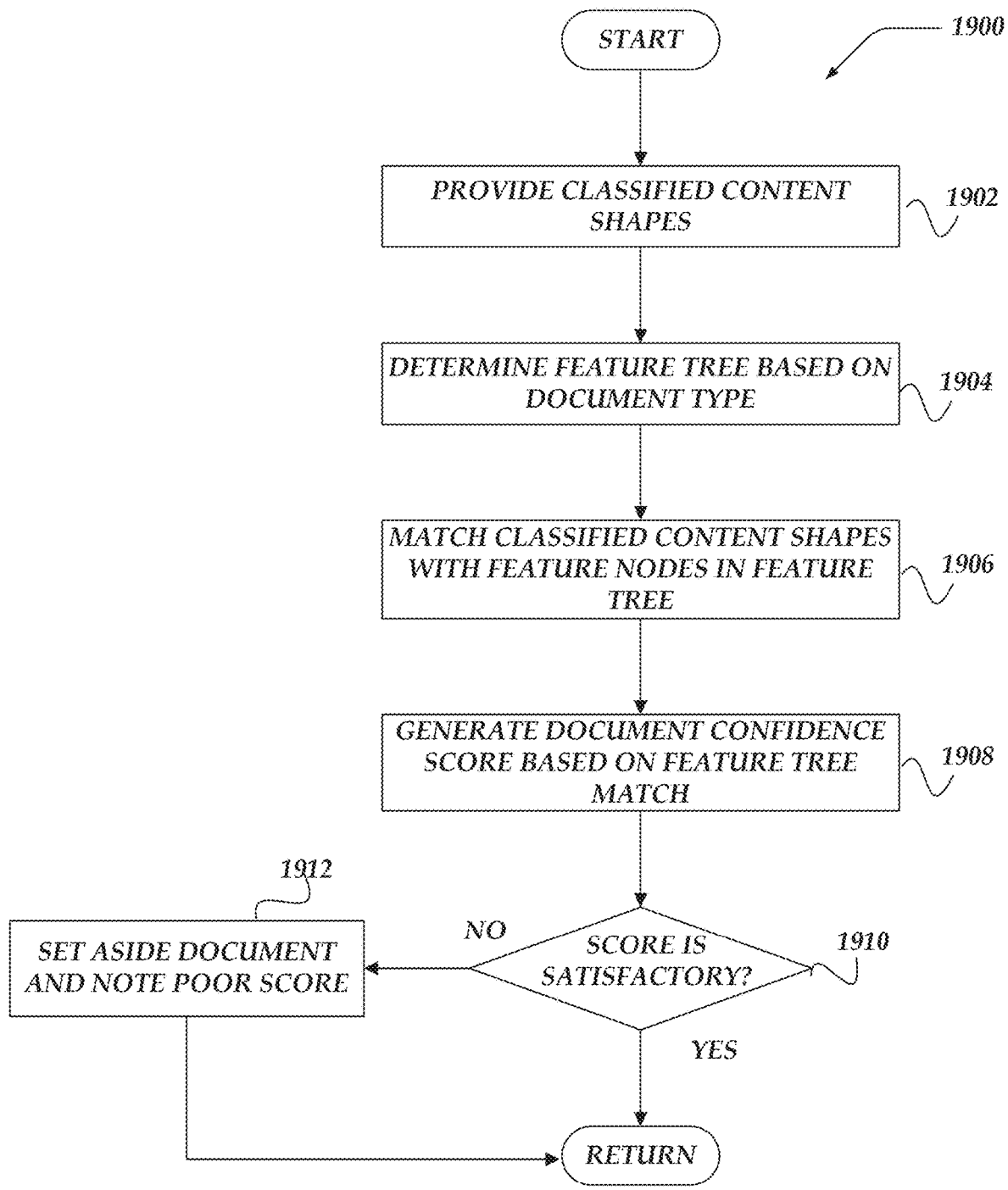
FIG. 19 illustrates a flowchart of a process for document ingestion pipelines in accordance with one or more of the various embodiments.

FIG. 19 illustrates a flowchart of process 1900 for document ingestion pipelines in accordance with one or more of the various embodiments. After a start block, at block 1902, in one or more of the various embodiments, ingestion engines may be arranged to provide one or more classified content shapes. As described above, ingestion engines may be arranged to generate one or more classified content shapes based on ingested documents.

At block 1904, in one or more of the various embodiments, ingestion engines may be arranged to determine a feature tree based on the document type. As described above, for some embodiments feature trees may be developed for different document types. Accordingly, in some embodiments, ingestion engines may be arranged to automatically select a feature tree for a given document type. In some embodiments, predictive learner platforms may provide one or more generalized feature trees that may be directed to particular document types, such as resumes, transcripts, job descriptions, course descriptions, or the like. Also, in some embodiments, ingestion engines may be arranged to enable organizations to customize feature trees to their particular documents.

In some embodiments, feature trees may include one or more feature nodes that may correspond to particular content shape types that may be expected to be included in given type of document.

In some embodiments, ingestion engines may be arranged to associate partial document confidence scores with feature nodes. Accordingly, in some embodiments, the more feature nodes matched by a document's classified content shapes the higher the document confidence score.

In some embodiments, ingestion engines or predictive learner platforms may employ document confidence scores to evaluate the quality of an overall processing or interpretation of a document.

At block 1906, in one or more of the various embodiments, ingestion engines may be arranged to match the one or more classified content shapes with feature nodes in the feature tree.

In some embodiments, ingestion engines may be arranged to compare the classified content shapes from ingested documents with the feature nodes that may be associated with the document types.

For example, if the document type may be a transcript document, the root feature node of the feature tree may be 'transcript' with down stream feature nodes representing classified content shapes that may be expected to included in transcript documents, such as academic session, session details, course information lines, summary lines (session GPA), or the like.

Similarly, for example, feature trees associated with document type resume may have root feature nodes representing the document type with a hierarchy of down stream feature nodes that correspond to classified content shapes that may be expected to be found in resume documents, such as, applicant profile, career goals, employment history, employment history record/item, educational history, educational history item, or the like.

In some embodiments, feature trees may be arranged to associate a classified content shapes confidence threshold value with some or all feature nodes. Accordingly, in some embodiments, classified content shapes that have a classification confidence score that exceeds the feature tree threshold value may be considered as matching. Thus, in some embodiments, ingestion engines may be arranged to omit low confidence classified content shapes from the feature tree match.

At block 1908, in one or more of the various embodiments, ingestion engines may be arranged to generate document confidence scores based on the feature tree matches. In some embodiments, ingestion engines may sum the partial document confidence score associated with matched feature nodes to produce an overall confidence score for the document.

At decision block 1910, in one or more of the various embodiments, if the confidence score may be sufficient, control may be returned to a calling process; otherwise, control may flow to block 1912.

At block 1912, in one or more of the various embodiments, ingestion engines may be arranged to set aside the document and note the poor score. In some embodiments, ingestion engines may be arranged to record which documents failed to meet the document confidence score requirements for the given document type.

In some embodiments, ingestion engines may be arranged to set aside low confidence documents to enable users or administrators to review the document, the low confidence classified content shapes (if any), and mismatched or unmatched classified content shapes.

Next, in one or more of the various embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware-based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method of managing documents over a network using one or more processors to execute instructions that are configured to cause actions, comprising:
   determining a plurality of terms in a document based on a term location of each term within the document;
   generating a layout graph that includes a plurality of term nodes based on the plurality of terms, wherein each of the plurality of terms corresponds to a different one of the plurality of term nodes, and wherein each term node is linked by one or more edges to one or more neighboring term nodes;
   determining one or more relationships between the plurality of term nodes based on a traversal of the layout graph, wherein the layout graph is partitioned into one or more content shapes based on a strength of the one or more relationships;
   classifying the one or more content shapes to reduce computational resources for extracting information from the document based on one or more types associated with each content shape by performing further actions, including:
      associating the one or more types with one or more extraction models that each support one or more of a plurality of different types of document formats, document sources, and document platforms;
      generating one or more prompts that include one or more features associated with the one or more content shapes, wherein the one or more prompts are provided to one or more generative artificial intelligence models, and wherein the one or more features include one or more of a term, a style feature, or a layout feature; and
      determining the one or more types for the one or more content shapes based on one or more responses from the one or more generative artificial intelligence models; and
   employing the one or more extraction models to extract information from the one or more classified content shapes, wherein the extracted information is stored in one or more data stores or included in one or more reports.

2. The method of claim 1, wherein classifying the one or more content shapes further comprises:
   determining the type for each content shape based on one or more of a shape location of the one or more content shapes in the document, a proximity of the one or more content shapes to one or more previously classified content shapes, or a match of content included in the one or more content shapes with one or more words or one or more phrases of the one or more terms associated with the content shape type.

3. The method of claim 1, wherein classifying the one or more content shapes further comprises:
   determining one or more patterns of a content included in the one or more content shapes, wherein the one or more geometric patterns are associated with one or more of a list, a table, heading, a footnote, a visualization, a sentence, or a paragraph; and
   determining the shape type based on one or more determined patterns of the content.

4. The method of claim 1, wherein partitioning the layout graph into the one or more content shapes, further, comprises:
   determining a geometric distance between the one or more neighboring term nodes in the document based on the traversal of the layout graph;
   determining one or more text styling indicators in the document; and
   pruning a portion of the one or more edges based on one or more of the geometric distance between the one or more neighboring term nodes exceeding a threshold value or the one or more text styling indicators.

5. The method of claim 1, further comprising:
   determining a confidence score associated with each classified content shape, wherein the confidence score is associated with a quality of a determination of the one or more types for each classified content shape; and
   generating a report that includes a portion of the one or more classified content shapes that are associated with a confidence score value that is lower than a threshold value.

6. The method of claim 1, further comprising:
   determining a feature tree associated with the document based on a document type of the document;
   comparing feature nodes included in the feature tree with the one or more classified content shapes;
   generating a confidence score for the document for the one or more classified content shapes based on the comparison, wherein the confidence score and a number of feature nodes that match the one or more classified content shapes are positively correlated; and
   reporting the confidence score that is associated with the document.

7. A network computer for managing documents, comprising:
   a memory that stores at least instructions; and one or more processors that execute instructions that are configured to cause actions, including:

determining a plurality of terms in a document based on a term location of each term within the document;

generating a layout graph that includes a plurality of term nodes based on the plurality of terms, wherein each of the plurality of terms corresponds to a different one of the plurality of term nodes, and wherein each term node is linked by one or more edges to one or more neighboring term nodes;

determining one or more relationships between the plurality of term nodes based on a traversal of the layout graph, wherein the layout graph is partitioned into one or more content shapes based on a strength of the one or more relationships;

classifying the one or more content shapes to reduce computational resources for extracting information from the document based on one or more types associated with each content shape by performing further actions, including:

associating the one or more types with one or more extraction models that each support one or more of a plurality of different types of document formats, document sources, and document platforms;

generating one or more prompts that include one or more features associated with the one or more content shapes, wherein the one or more prompts are provided to one or more generative artificial intelligence models, and wherein the one or more features include one or more of a term, a style feature, or a layout feature; and determining the one or more types for the one or more content shapes based on one or more responses from the one or more generative artificial intelligence models; and employing the one or more extraction models to extract information from the one or more classified content shapes, wherein the extracted information is stored in one or more data stores or included in one or more reports.

8. The network computer of claim 7, wherein classifying the one or more content shapes further comprises:

determining the type for each content shape based on one or more of a shape location of the one or more content shapes in the document, a proximity of the one or more content shapes to one or more previously classified content shapes, or a match of content included in the one or more content shapes with one or more words or one or more phrases of the one or more terms associated with the content shape type.

9. The network computer of claim 7, wherein classifying the one or more content shapes further comprises:

determining one or more patterns of a content included in the one or more content shapes, wherein the one or more geometric patterns are associated with one or more of a list, a table, heading, a footnote, a visualization, a sentence, or a paragraph; and determining the shape type based on one or more determined patterns of the content.

10. The network computer of claim 7, wherein partitioning the layout graph into the one or more content shapes, further, comprises:

determining a geometric distance between the one or more neighboring term nodes in the document based on the traversal of the layout graph;

determining one or more text styling indicators in the document; and pruning a portion of the one or more edges based on one or more of the geometric distance between the one or more neighboring term nodes exceeding a threshold value or the one or more text styling indicators.

11. The network computer of claim 7, wherein the one or more processors execute instructions that are configured to cause actions that perform actions, further comprising:

determining a confidence score associated with each classified content shape, wherein the confidence score is associated with a quality of a determination of the one or more types for each classified content shape; and generating a report that includes a portion of the one or more classified content shapes that are associated with a confidence score value that is lower than a threshold value.

12. The network computer of claim 7, wherein the one or more processors execute instructions that are configured to cause actions that perform actions, further comprising:

determining a feature tree associated with the document based on a document type of the document;

comparing feature nodes included in the feature tree with the one or more classified content shapes;

generating a confidence score for the document for the one or more classified content shapes based on the comparison, wherein the confidence score and a number of feature nodes that match the one or more classified content shapes are positively correlated; and reporting the confidence score that is associated with the document.

13. A processor readable non-transitory storage media that includes instructions configured for managing documents in a computing environment, wherein execution of the instructions by one or more processors on one or more network computers performs actions, comprising:

determining a plurality of terms in a document based on a term location of each term within the document;

generating a layout graph that includes a plurality of term nodes based on the plurality of terms, wherein each of the plurality of terms corresponds to a different one of the plurality of term nodes, and wherein each term node is linked by one or more edges to one or more neighboring term nodes;

determining one or more relationships between the plurality of term nodes based on a traversal of the layout graph, wherein the layout graph is partitioned into one or more content shapes based on a strength of the one or more relationships;

classifying the one or more content shapes to reduce computational resources for extracting information from the document based on one or more types associated with each content shape by performing further actions, including:

associating the one or more types with one or more extraction models that each support one or more of a plurality of different types of document formats, document sources, and document platforms;

generating one or more prompts that include one or more features associated with the one or more content shapes, wherein the one or more prompts are provided to one or more generative artificial intelligence models, and wherein the one or more features include one or more of a term, a style feature, or a layout feature; and determining the one or more types for the one or more content shapes based on one or more responses from the one or more generative artificial intelligence models; and employing the one or more extraction models to extract information from the one or more classified content shapes, wherein the extracted information is stored in one or more data stores or included in one or more reports.

14. The media of claim 13, wherein classifying the one or more content shapes further comprises:
determining the type for each content shape based on one or more of a shape location of the one or more content shapes in the document, a proximity of the one or more content shapes to one or more previously classified content shapes, or a match of content included in the one or more content shapes with one or more words or one or more phrases of the one or more terms associated with the content shape type.

15. The media of claim 13, wherein classifying the one or more content shapes further comprises:
determining one or more patterns of a content included in the one or more content shapes, wherein the one or more geometric patterns are associated with one or more of a list, a table, heading, a footnote, a visualization, a sentence, or a paragraph; and
determining the shape type based on one or more determined patterns of the content.

16. The media of claim 13, wherein partitioning the layout graph into the one or more content shapes, further, comprises:
determining a geometric distance between the one or more neighboring term nodes in the document based on the traversal of the layout graph;
determining one or more text styling indicators in the document; and
pruning a portion of the one or more edges based on one or more of the geometric distance between the one or more neighboring term nodes exceeding a threshold value or the one or more text styling indicators.

17. The media of claim 13, further comprising:
determining a confidence score associated with each classified content shape, wherein the confidence score is associated with a quality of a determination of the one or more types for each classified content shape; and
generating a report that includes a portion of the one or more classified content shapes that are associated with a confidence score value that is lower than a threshold value.

18. The media of claim 13, further comprising:
determining a feature tree associated with the document based on a document type of the document;
comparing feature nodes included in the feature tree with the one or more classified content shapes;
generating a confidence score for the document for the one or more classified content shapes based on the comparison, wherein the confidence score and a number of feature nodes that match the one or more classified content shapes are positively correlated; and
reporting the confidence score that is associated with the document.

19. A system for managing documents, comprising:
a network computer, comprising:
a memory that stores at least instructions; and
one or more processors that execute the instructions that are configured to cause actions, including:
determining a plurality of terms in a document based on a term location of each term within the document;
generating a layout graph that includes a plurality of term nodes based on the plurality of terms, wherein each of the plurality of terms corresponds to a different one of the plurality of term nodes, and wherein each term node is linked by one or more edges to one or more neighboring term nodes;
determining one or more relationships between the plurality of term nodes based on a traversal of the layout graph, wherein the layout graph is partitioned into one or more content shapes based on a strength of the one or more relationships;
classifying the one or more content shapes to reduce computational resources for extracting information from the document based on one or more types associated with each content shape by performing further actions, including:
associating the one or more types with one or more extraction models that each support one or more of a plurality of different types of document formats, document sources, and document platforms;
generating one or more prompts that include one or more features associated with the one or more content shapes, wherein the one or more prompts are provided to one or more generative artificial intelligence models, and wherein the one or more features include one or more of a term, a style feature, or a layout feature; and
determining the one or more types for the one or more content shapes based on one or more responses from the one or more generative artificial intelligence models; and
employing the one or more extraction models to extract information from the one or more classified content shapes, wherein the extracted information is stored in one or more data stores or included in one or more reports; and
a client computer, comprising:
a memory that stores at least instructions; and
one or more processors execute the instructions that are configured to cause actions, including:
providing the document description.

20. The system of claim 19, wherein classifying the one or more content shapes further comprises:
determining the type for each content shape based on one or more of a shape location of the one or more content shapes in the document, a proximity of the one or more content shapes to one or more previously classified content shapes, or a match of content included in the one or more content shapes with one or more words or one or more phrases of the one or more terms associated with the content shape type.

21. The system of claim 19, wherein classifying the one or more content shapes further comprises:
determining one or more patterns of a content included in the one or more content shapes, wherein the one or more geometric patterns are associated with one or more of a list, a table, heading, a footnote, a visualization, a sentence, or a paragraph; and
determining the shape type based on one or more determined patterns of the content.

22. The system of claim 19, wherein partitioning the layout graph into the one or more content shapes, further, comprises:
determining a geometric distance between the one or more neighboring term nodes in the document based on the traversal of the layout graph;

determining one or more text styling indicators in the document; and pruning a portion of the one or more edges based on one or more of the geometric distance between the one or more neighboring term nodes exceeding a threshold value or the one or more text styling indicators.

23. The system of claim 19, wherein the one or more network computer processors execute instructions that are configured to cause actions that perform actions, further comprising:

determining a confidence score associated with each classified content shape, wherein the confidence score is associated with a quality of a determination of the one or more types for each classified content shape; and generating a report that includes a portion of the one or more classified content shapes that are associated with a confidence score value that is lower than a threshold value.

24. The system of claim 19, wherein the one or more network computer processors execute instructions that are configured to cause actions that perform actions, further comprising:

determining a feature tree associated with the document based on a document type of the document;

comparing feature nodes included in the feature tree with the one or more classified content shapes;

generating a confidence score for the document for the one or more classified content shapes based on the comparison, wherein the confidence score and a number of feature nodes that match the one or more classified content shapes are positively correlated; and reporting the confidence score that is associated with the document.

* * * * *